US012083816B2

(12) United States Patent
Holmes

(10) Patent No.: US 12,083,816 B2
(45) Date of Patent: Sep. 10, 2024

(54) SECURITY DEVICES AND METHODS OF MANUFACTURE

(71) Applicant: DE LA RUE INTERNATIONAL LIMITED, Basingstoke (GB)

(72) Inventor: Brian Holmes, Fleet (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 15 days.

(21) Appl. No.: 17/626,714

(22) PCT Filed: Jul. 10, 2020

(86) PCT No.: PCT/GB2020/051676

§ 371 (c)(1),
(2) Date: Jan. 12, 2022

(87) PCT Pub. No.: WO2021/009498

PCT Pub. Date: Jan. 21, 2021

(65) Prior Publication Data

US 2022/0250404 A1 Aug. 11, 2022

(30) Foreign Application Priority Data

Jul. 12, 2019 (GB) ..................................... 1910042

(51) Int. Cl.
*B42D 25/324* (2014.01)
*B42D 25/328* (2014.01)
(Continued)

(52) U.S. Cl.
CPC ......... *B42D 25/324* (2014.10); *B42D 25/328* (2014.10); *B42D 25/351* (2014.10); *B42D 25/373* (2014.10)

(58) Field of Classification Search
CPC ............................ B42D 25/324; B42D 25/328
See application file for complete search history.

(56) References Cited

U.S. PATENT DOCUMENTS

2012/0319395 A1 12/2012 Fuhse et al.
2015/0192897 A1* 7/2015 Schilling ............. B42D 25/373 359/2
(Continued)

FOREIGN PATENT DOCUMENTS

DE 10 2010 047 250 A1 6/2011
DE 102011121653 A1 * 6/2013 ............ G02B 27/06
(Continued)

OTHER PUBLICATIONS

WO-2012048847-A1 English Translation (Year: 2012).*
(Continued)

*Primary Examiner* — Kyle R Grabowski
(74) *Attorney, Agent, or Firm* — Oliff PLC

(57) ABSTRACT

A security device includes an array of reflective elements including at least first and second sets of reflective elements, which are regularly or irregularly interlaced along at least a first interlacing direction across a first area of the security device. A non-dispersive colour-generating structure is in the surface of first and/or second sets of reflective elements. The first set of reflective elements is configured to collectively exhibit a first image across the first area of the security device to a viewer within a first viewing zone and direct incident light convergently and/or divergently towards this zone. The second set of reflective elements is configured to collectively exhibit a second image across the first area of the security device to the viewer within a second viewing zone. The structure is modulated across the first and/or second sets of reflective elements such that the first and/or second images include multiple colours.

20 Claims, 18 Drawing Sheets

(51) Int. Cl.
*B42D 25/351* (2014.01)
*B42D 25/373* (2014.01)

(56) References Cited

U.S. PATENT DOCUMENTS

| | | | | |
|---|---|---|---|---|
| 2016/0023495 | A1* | 1/2016 | Fuhse | B42D 25/342 359/566 |
| 2017/0341454 | A1* | 11/2017 | Seils | B42D 25/328 |
| 2020/0223243 | A1* | 7/2020 | Petiton | G02B 5/1861 |
| 2020/0341174 | A1* | 10/2020 | Keshavarz Akhlaghi | G02B 5/008 |

FOREIGN PATENT DOCUMENTS

| | | | | | |
|---|---|---|---|---|---|
| EP | 0 059 056 | A1 | | 9/1982 | |
| EP | 0 860 298 | A2 | | 8/1998 | |
| EP | 2 042 343 | A1 | | 4/2009 | |
| GB | 2572745 | A | * | 10/2019 | B42D 25/29 |
| GB | 2572746 | A | | 10/2019 | |
| JP | 2018-024105 | A | | 2/2018 | |
| WO | 83/00659 | A1 | | 3/1983 | |
| WO | 00/39391 | A1 | | 7/2000 | |
| WO | 03/054297 | A2 | | 7/2003 | |
| WO | 03/095188 | A2 | | 11/2003 | |
| WO | WO-2012048847 | A1 | * | 4/2012 | B42D 25/29 |
| WO | WO-2019002872 | A1 | * | 1/2019 | B42D 25/23 |
| WO | WO-2019180460 | A1 | * | 9/2019 | B42D 25/29 |
| WO | WO-2019186165 | A1 | * | 10/2019 | B29D 11/00 |

OTHER PUBLICATIONS

Jul. 22, 2022 Examination Report issued in Great Britain Application No. 1910042.9.

Sep. 29, 2020 International Search Report issued in International Patent Application No. PCT/GB2020/051676.

Sep. 29, 2020 Written Opinion issued in International Patent Application No. PCT/GB2020/051676.

Shawn J. Tan et al. "Plasmonic Color Palettes for Photorealistic Printing With Aluminum Nanostructures". Nano Letters, 2014, vol. 14, No. 7, pp. 4023-4029.

Yinghong Gu et al. "Color Generation Via Subwavelength Plasmonic Nanostructures". Nanoscale, 2015, vol. 7, pp. 6409-6419.

Anders Kristensen et al. "Plasmonic Colour Generation". Nature Reviews Materials, 2016, vol. 2, No. 16088, pp. 1-14.

Philippe Lalanne. "Artificial Media Optical Properties—Subwavelength Scale". Encyclopedia of Optical Engineering, 2003, pp. 62-71.

Van Renesse, Rudolf, "Diffraction-Based Security Features", Optical Document Security, Chapter 6, 3rd Edition, 2004, pp. 171-222.

* cited by examiner

SECURITY DEVICES AND METHODS OF MANUFACTURE

FIELD OF THE INVENTION

The present invention relates to security devices such as those suitable for use in or on security documents such as banknotes, identity documents, passports, certificates and the like, as well as methods for manufacturing such security devices.

DESCRIPTION OF THE RELATED ART

To prevent counterfeiting and enable authenticity to be checked, security documents are typically provided with one or more security devices which are difficult or impossible to replicate accurately with commonly available means, particularly photocopiers, scanners or commercial printers.

One class of security devices uses an array of reflective elements, commonly referred to as micromirrors, to generate an optically variable effect. Such devices use different orientations of different ones of the micromirrors within the array to direct incident light in different directions. As the security device is viewed under different conditions, either by rotation of the security device or movement of the viewer or light source, different ones of the differently oriented micromirrors direct light in the direction of the viewer. By appropriate arrangement and cooperation of different sets of the micromirrors, different effects can be recognised at different viewing angles as different areas of the security device appear bright.

There is a constant need to make improvements to security devices to stay a step ahead of counterfeiters. In particular, it is desirable to make these optically variable effects more visually striking to improve recognition of the effect and make it easier for viewers to identify counterfeits while also making the security device harder to convincingly replicate for the counterfeiter.

SUMMARY OF THE INVENTION

In accordance with a first aspect of the present invention there is provided a security device comprising: an array of reflective elements including at least a first set of reflective elements and a second set of reflective elements, the first and second sets of reflective elements being regularly or irregularly interlaced along at least a first interlacing direction across a first area of the security device, and a non-dispersive colour-generating structure provided in the surface of first and/or second sets of reflective elements; wherein the first set of reflective elements is configured to collectively exhibit a first image across the first area of the security device to a viewer within a first viewing zone and wherein the second set of reflective elements is configured to collectively exhibit a second image across the first area of the security device to the viewer within a second viewing zone different from the first viewing zone; wherein the non-dispersive colour generating structure is modulated across the first and/or second sets of reflective elements such that the first and/or second images include multiple colours; and wherein the first set of reflective elements is configured to collectively direct incident light convergently and/or divergently towards the first viewing zone of the first image.

Embodiments of the present invention include a security device in which a non-dispersive colour-generating structure is provided in the surfaces of the reflective elements. This structure acts to colour white light reflected by the micromirrors such that multiple colours are exhibited by the security device. Furthermore, since this colour is provided by a structure formed in the surface of the reflective elements, which are themselves formed by a relief structure giving the elements their respective orientations, this colour-generating structure may be formed simultaneously with the reflective elements, ensuring integral register between the colours provided by the non-dispersive colour-generating structure and the corresponding areas of the different images produced by the different sets of reflective elements. Such accurate registration of colours within and/or between different images is very difficult to recreate with other methods, such as printing a translucent colour ink over an array of reflective elements.

Not only is the appearance of the security device improved by precise registration of colours in and/or between images, but at least one set of reflective elements is configured to collectively direct incident light convergently and/or divergently towards the first viewing zone of the first image. That is, rather than every reflective element of each set of reflective elements having the same angle to effectively focus reflected light for each image at infinity, the orientations of the reflective elements within one set will vary across the security device such that, collectively, the set acts to converge or diverge light.

In embodiments in which light is made to converge towards a viewing zone, i.e. a region in three dimensional space at which the image is displayed, the image will be displayed brightly as reflective elements are individually directing light towards the viewing position. The high brightness of the image displayed in this manner provides a visually striking effect, which is difficult to match in counterfeit devices. Another effect of the light converging towards the first viewing zone is that the image will disappear after a relatively small change in viewing condition, e.g. rotation of the security device or movement of the light source or viewer, meaning such devices lend themselves to image switch effects, i.e. where the first image disappears and is replaced by the second image visible across a second viewing zone.

In embodiments in which light is made to diverge towards a viewing zone, the image will be less bright, but will be visible over a wider viewing zone. This can be used to provide less downtime to the security device, i.e. a smaller range of viewing angles over which no clear image can be seen by the viewer. This makes the security device less sensitive to its viewing conditions and more likely to display a recognisable image to a viewer when viewed in any set of viewing conditions, which can help a viewer quickly authenticate the security device and provide another aspect to the appearance of the device that has to be matched by counterfeiters.

Both the first and second sets of reflective elements exhibit respective different images across corresponding viewing zones. An image may be, for example, an indicium, including alphanumeric characters and symbols, or may be a picture, such as a landscape, portrait, building or animal. The first and second images may have a different form or may have different colours, or both. In any case, the image may be produced by the arrangement of the reflective elements within the corresponding set, or by the arrangement and/or modulation of the non-dispersive colour-generating structure, or both. For example, the first set of reflective elements may be provided across an area delimiting a symbol, e.g. "£", and then the non-dispersive colour-generating structure may be provided uniformly across all of the first set of reflective elements to provide the image with a colour, e.g. red. In this case, when viewed in the first viewing zone, the symbol is produced by bright red areas against a dark background, the bright red areas corresponding to areas including reflective elements (carrying the non-dispersive colour-generating structure) directing light towards the viewer and the dark background corresponding to areas not including reflective elements belonging to the first set. Alternatively, for example, the first set of reflective elements may be provided across a regular area, such as a square area or circular area, and the non-dispersive colour-generating structure arranged to define a symbol, e.g. "£", within that regular area. For example, the non-dispersive colour-generating structure may be provided only on certain reflective elements delimiting the symbol, with characteristics of the structure producing a colour, e.g. red. In this case, when viewed in the first viewing zone, the symbol is produced by red coloured reflected light against a bright white background where the reflected light is not coloured, the red areas corresponding to areas including reflective elements directing light towards the viewer and having the non-dispersive colour-generating structure and the bright background corresponding to areas including reflective elements directing light towards the viewer and without the non-dispersive colour-generating structure. In many examples, a combination of the arrangement of the reflective elements and the arrangement and modulation of the non-dispersive colour-generating structure on the reflective elements may be used to build up the image, e.g. the positioning of the facets providing an outline of a person or animal and the non-dispersive colour-generating structure providing the details and colours within the outline.

As indicated above, the first set of reflective elements may reflect light in both a converging and diverging manner towards the first viewing zone. This is because light may be converging in one direction, e.g. in a horizontal plane, while diverging in another direction, e.g. in a vertical plane, when the security device is oriented and viewed vertically. Indeed, this may be advantageous in some cases, as will be described below, where one direction of rotation is typically expected to provide optical variability and another is not. For example, viewers are typically used to rotating a bank note about a vertical axis to provide an optically variable replay, and so converging light may allow for multiple clear image switches to be provided, while the diverging light in the vertical direction ensures that the image is visible regardless of the positioning of an overhead light source in the vertical plane.

All of the reflective elements will preferably be provided by a single relief structure provided in the surface of a layer of formable material, such as a UV curable material. The non-dispersive colour-generating structure will also preferably be defined by the same relief structure provided in the surface of the formable layer. This layer of formable material may be coated with a reflective material, such as a metal or high refractive index material, in order to render the reflective elements reflective and to ensure the non-dispersive colour-generating structure is operational.

As noted above, the array of reflective elements comprises at least first and second sets of reflective elements that display respective images, but it will be appreciated that the security device is not limited to only two sets of reflective elements generating two images, and further sets could be provided for generating further images in additional viewing zones.

The first and second sets of reflective elements are regularly or irregularly interlaced along at least a first interlacing direction across a first area of the security device. For example, each reflective element may be an elongate reflective element extending along the length of the security device, in which case the reflective elements may be interlaced only along one direction, i.e. the first interlacing direction, corresponding to the width of the security device. This interlacing may be regular, e.g. there may be alternating reflective elements belonging to the first and then the second set of reflective elements; however, regular interlacing is not essential. For example, where the interlacing is on a scale that is not discernible by the human eye, a viewer will see no break in the first image regardless of the precise positioning of reflective elements of the first set.

It will also be appreciated that the security device comprises at least a first area across which the first and second set of reflective elements are interlaced; however, in some embodiments, one or more sets of reflective elements could extend out beyond this first area. For example, the first set of reflective elements may be provided across an area delimiting a symbol, e.g. "£", while the second set of elements may be provided across an overlapping area delimiting a different symbol, e.g. "5", with the two sets being provided interlaced with one another in specific areas in which the outlines of the symbols overlap.

The present invention uses a non-dispersive colour-generating structure, which is a class of structure that exhibits colour when illuminated by white light, but does not exhibit diffractive dispersion effects. Specific examples of these structures will be given below, but in essence this means that light is not diffracted by the structure into a cone of angles in dependence on wavelength and, consequently, the structure will not exhibit strong colour variation upon tilting the device or upon changing the illumination angle, as is the case with conventional diffraction gratings. The use of a non-dispersive colour-generating structure is advantageous as it prevents dispersive effects from causing overlapping light from different reflective elements, which may impact the clarity of the final image.

As mentioned above, the non-dispersive colour generating structure is modulated across the first and/or second sets of reflective elements such that the first and/or second images include multiple colours. This modulation will typically comprise a variation of the parameters of the structure across the security device. Specific examples of parameters that can be modulated will be given below for different types of non-dispersive colour-generating relief structure. The parameters may be varied such the structure is different between the different sets of reflective elements, e.g. such that the first image appears in a first colour and the second image appears in a second colour different from the first colour. Alternatively, the structure could be modulated within or between different reflective elements of the first set of reflective elements such that the first image includes multiple colours. Similarly, the structure could alternatively or additionally be modulated within or between different reflective elements of the second set of reflective elements such that the second image includes multiple colours. In practice, the structure will typically be varied to produce full colour images on both the first and second sets of reflective elements.

While the above has focussed on the first set of reflective elements reflecting light so as to converge or diverge towards the first viewing zone, it will be appreciated that typically the second set of reflective elements is configured to collectively direct incident light convergently and/or divergently towards the second viewing zone of the second image. Where more than two sets of reflective elements are provided, each will typically configured to collectively direct incident light convergently and/or divergently towards a corresponding viewing zone of a corresponding image.

In some embodiments, the first set of reflective elements comprises a first array of elongate reflective elements and/or the second set of reflective elements comprises a second array of elongate reflective elements, and wherein the first and second sets of reflective elements are regularly or irregularly interlaced along the first interlacing direction across the first area of the security device. To aid with understanding, ignoring interlacing, an example of a converging reflector would be a concave, bowl-shaped reflective surface, while an example of a diverging reflector would be a convex reflective surface. In the embodiments referred to above, each reflective element of the first set of reflective elements may essentially define a corresponding elongate strip of a converging and/or diverging reflective surface such that, collectively, the first set of reflective elements replicate the converging or diverging effect produced by such a concave or convex surface. So, each elongate element of the first set may correspond to a respective portion of a concave, bowl-shaped reflective surface or a convex reflective surface, depending on the desired effect on incident light. This may mean that each reflective element varies in its local surface normal over its length, e.g. to correspond to a strip of a concave, bowl-shaped reflective surface, or may have a constant local surface normal along its length, e.g. to correspond to a strip of a concave trough-shaped reflective surface. It will be appreciated that, where the elements of the first and second sets are elongate, e.g. extending the full length of the security device, or at least the full length of the first area, the elements will typically be interlaced in the direction perpendicular to the elongate direction of the reflective elements.

In other embodiments, the first set of reflective elements comprises a first two-dimensional array of reflective elements and/or the second set of reflective elements comprises a second two-dimensional array of reflective elements, and wherein preferably the first and second sets of reflective elements are regularly or irregularly interlaced along both the first interlacing direction and a second interlacing direction orthogonal to the first interlacing direction across the first area of the security device. In these embodiments, instead of each reflective element corresponding to an elongate strip of a converging or diverging reflective surface, each reflective element will correspond to a small area of a converging and/or diverging reflective surface, with the set of reflective elements extending in a two dimensional array to collectively replicate the converging or diverging effect produced by such a concave or convex surface. Where both the first and second sets of reflective elements are two-dimensional arrays of reflective elements, the sets will typically be interlaced along two orthogonal directions. For example, the sets may be interlaced across the first area in a checkerboard pattern arrangement. This is an example of a regular interlacing pattern and, as noted above, the interlacing pattern could also be irregular.

Indeed, preferably the first and second sets of reflective elements are regularly or irregularly interlaced along the first interlacing direction such that at least some of the reflective elements belonging to the first set are spaced along the first interlacing direction by at most 1000 μm, preferably at most 100 μm, more preferably at most 50 μm, and/or such that at least some of the reflective elements belonging to the second set are spaced along the first interlacing direction by at most 1000 μm, preferably at most 100 μm, more preferably at most 50 μm. By this, it is meant that at least some of the reflective elements of one set are spaced from their nearest neighbour in the interlacing direction(s) by at most 1000 μm, preferably at most 100 μm, more preferably at most 50 μm. Regions of the device in which reflective elements within each set are so spaced from each other, a viewer will struggle to perceive spaces between the reflective elements of each set, and so will see a continuous first and/or second image across the first area. This effect will be pronounced as smaller spacings are used, and particularly below 100 μm the interlacing will not be visible at all to the naked eye. Where the first and second sets of reflective elements are regularly or irregularly interlaced along both the first interlacing direction and a second interlacing direction orthogonal to the first interlacing direction preferably at least some of the reflective elements belonging to the first set are spaced along the second interlacing direction by at most 1000 μm, preferably at most 100 μm, more preferably at most 50 μm, and/or such that at least some of the reflective elements belonging to the second set are spaced along the second interlacing direction by at most 1000 μm, preferably at most 100 μm, more preferably at most 50 μm.

In some embodiments, the non-dispersive colour-generating relief structure comprises a first array of plasmonic nanostructures provided in the surface of first set of reflective elements and/or a second array of plasmonic nanostructures provided in the surface of second set of reflective elements. Plasmonic nanostructures are structures that generate colour from the resonant interactions between light and metallic nanostructures where collective free-electron oscillations within the metallic nanostructure couple to electromagnetic fields in a neighbouring dielectric material. These structures are described in detail in: "Plasmonic Color Palettes for Photorealistic Printing with Aluminum Nanostructures", Shawn J. Tan et al., Nano Letters, 2014, 14 (7), pp 4023-4029, DOI: 10.1021/nl501460x; "Color generation via subwavelength plasmonic nanostructures", Yinghong Gu et al., Nanoscale, 2015, 7, pp 6409-6419, DOI: 10.1039/C5NR00578G; and "Plasmonic colour generation", Anders Kristensen et al., Nat. Rev. Mater. 2, 16088, (2016), pp 1-14, DOI: 10.1038/natrevmats.2016.88.

Plasmonic nanostructures are an example of a structure that is capable of generating colour that does not exhibit angular dispersion, as is the case with conventional diffraction gratings, where light rays corresponding to the first order diffractive orders redirected or diffracted by angles (beta) relative to the substrate normal according to the diffraction equation:

$$\frac{\lambda}{d} = \sin\alpha \pm \sin\beta$$

where λ is wavelength of incident light, d is the width of a slit, a is the angle of incidence and β is the angle of first order diffraction. Rather, the surface plasmon polariton resonance effects act to subtract certain parts of the incident light spectrum from the specular reflected light such that a net colour is imparted. For example if the plasmonic resonances act to suppress the reflection of light in the green part of the spectrum (circa 520-550 nm) then the net reflected light will have a magenta hue or colour. Whereas if the blue part of the incident spectrum is suppressed by plasmon coupling in reflection then the net reflected light will have a yellow hue. Note this subtractive colour effect will not be substantially modified by the angle of incidence and reflection and therefore plasmonic nanostructures can be substantially optically invariable, meaning that white light at substantially any angle of incidence will generate substantially the same colour for a particular viewing angle. This intrinsic optical invariability is coupled with the optical variability providable by an array of reflective elements, as detailed above, to achieve an optically variable device whose variable appearance is controlled by the interlacing of different sets of reflective elements.

Plasmonic nanostructures are typically sub-wavelength, by which it is meant that they have dimensions less than the wavelength of visible light, e.g. 500 nm or less.

Preferably, the plasmonic nanostructures of the first and/or second arrays of plasmonic nanostructures vary in at least one of their shape, size and spacing across the first and/or second arrays of plasmonic nanostructures such that the first and/or second images include multiple colours. Here "shape" refers to the outline of the nanostructure, i.e. the metal cover and/or the dielectric material, "size" refers to the dimensions of the nanostructure and "spacing" refers to the lateral distance between the centres of adjacent nanostructures. Each of these factors affects the colour generated by a region of the plasmonic nanostructure. This phenomenon is described in "Plasmonic Color Palettes for Photorealistic Printing with Aluminum Nanostructures", Shawn J. Tan et al., Nano Letters, 2014, 14 (7), pp 4023-4029, DOI: 10.1021/nl501460x. In contrast with printing, different sizes, shapes and spacings, and hence different colours, can be provided within the same forming process and thereby be integrally registered to one another. Varying shape, size and/or spacing of the plasmonic nanostructures can be used to provide varying colour. For example, the structure provided in the first set of reflective elements may have a certain size, shape and spacing to provide a first colour and the structure provided in the second set of reflective elements may have a different size, shape and spacing to provide a second colour, thereby providing the first and second images with different colours. Alternatively, the shape, size and/or spacing may be varied across the first set of reflective elements so that the first image includes multiple different colours. The same may be true for the second set of reflective elements.

In many embodiments, the array of reflective elements comprises a dielectric layer coated with a metal layer arranged to define the first and second sets of reflective elements, and the first and/or second array of plasmonic nanostructures in the surface of the first and/or second array of reflective elements comprises a two-dimensional array of nanopillars, each nanopillar comprising a dielectric body provided by the dielectric layer and each nanopillar being topped by a continuous metal cover layer provided by the metal layer and typically further having a complementary metallic hole as a back reflector. Such pillars may be circular in horizontal cross-section, or may have other shapes such as square or oval. As has been mentioned, the shape may be configured to affect the colour generated by the array of plasmonic nanostructures. These nanopillars may have a diameter (largest width) in the range 10 to 500 nm.

In alternative embodiments, the array of reflective elements comprises a dielectric layer coated with a metal layer arranged to define the first and second sets of reflective elements, and the first and/or second array of plasmonic nanostructures in the surface of the first and/or second array of reflective elements comprises a two-dimensional array of nanoholes through at least the metal layer. Typically the nanohole will extend into the dielectric layer such that the structure may be defined by the form of the dielectric layer. For example, the hole may be formed in a UV curable material as typically used for cast cure replication of surface relief micro-structures. Typical substrate materials include acrylated oligomers such as acrylic esters of polyesters, polyethers, polyurethanes and epoxy resins. Alternatively, the hole may be formed in suitable thermoplastic materials often based on acrylic (PMMA) or urethane chemistries. The nanohole may further comprise a metal layer at the base of the nanohole.

While plasmonic nanostructures are preferable, other types of non-dispersive colour-generating structure may be used. For example, the non-dispersive colour-generating relief structure may comprise a first zero order diffractive structure, such as a zero order diffraction grating, provided in the surface of first set of reflective elements and/or a second zero order diffractive structure, such as a zero order diffraction grating, provided in the surface of second set of reflective elements. Zero order diffractive structures refers to diffractive structures that exhibit practically no first or higher order diffractive effects and exhibit effects such as colour effects in the specular direction, thereby lending themselves to providing a colouring effect of reflected light from an array of reflective elements. In contrast, conventional dispersive structures, e.g. first order diffractive structures, will exhibit effects in multiple orders, including the zero order, but in most cases the effect in the zero order will not be visually striking, e.g. a dulling of reflection.

In these embodiments, the first and/or second zero order diffractive structure may vary in one or more of the pitch of the relief structure, the orientation of the relief structure, and the profile of the elements of the diffractive structure across the first and/or second arrays of plasmonic nanostructures such that the first and/or second images include multiple colours. That is, these parameters control the colour exhibited by typical zero order diffractive structures.

The present invention applies in particular to zero order diffractive structures that exhibit rotational colour shift. Such zero order diffractive structures are produced by a rectangular relief structure (or binary relief structure) formed in a substantially transparent material, the relief structure being coated on the peaks and troughs (e.g. by a directional deposition technique) with a transparent high refractive index material (i.e. refractive index of 1.5 or more, preferably 2.0 or more), and further overcoated by a transparent material with an index which substantially matches that of the transparent material in which the rectangular relief structure is formed. The relief structure will typically have a pitch of between 100 nm and 500 nm, preferably between 200 nm and 400 nm, and a peak to trough height of between 200 nm and 600 nm, preferably between 300 nm and 500 nm, most preferably approximately 400 nm. The transparent high refractive index material, (such as ZnS) will typically be applied with a thickness of 50 nm to 200 nm, preferably 100 nm to 200 nm, preferably approximately 150 nm. The precise colour exhibited by the zero order diffractive structure will be determined by the grating depth to pitch ratio, the index difference between high and low material and the thickness of the high index lamella. Further details of such zero order diffractive structures may be found in "Optical Document Security", by Rudolf van Renesse, 3rd Edition, 2004, Chapter X. The rotational colour shift may provide additional optical variability that depends on the azimuthal orientation of the security device, rather than observation and illumination angle.

One major advantage of the types of non-dispersive colour generating structure described above is that they rely on very fine microstructures to generate colour. These structures therefore lend themselves to formation of high resolution imagery. Therefore, preferably, the non-dispersive colour-generating relief structure is modulated across the first set of reflective elements such that at least one of the reflective elements of the first set of reflective elements exhibits multiple colours, preferably such that a subset of the first set of reflective elements each exhibit multiple colours, and/or wherein the non-dispersive colour-generating relief structure is modulated across the second set of reflective elements such that at least one of the reflective elements of the second set of reflective elements exhibits multiple colours, preferably such that a subset of the second set of reflective elements each exhibit multiple colours. For example, the non-dispersive colour-generating relief structure may be modulated on a scale less than the dimension of the reflective elements along the or each interlacing direction. In other words, it is possible to achieve colour variation on a scale smaller than the individual reflective elements. Therefore, whereas prior devices may give the impression of a low-resolution pixelated image owing to, at best, individual colours being mapped to individual reflective elements, the present invention may have multiple colours across individual reflective elements, which can help to improve the apparent resolution of the imagery and avoid the pixelated appearance of the images.

Some embodiments may further comprise an anti-reflective microstructure provided in the surface of first and/or second sets of reflective elements, the anti-reflective microstructure preferably defining substantially black portions of the first and/or second images. Common anti-reflective structures include one or two-dimensional moth-eye relief structure. Anti-reflection structures such as these are designed to reduce reflections arising from abrupt changes in the refractive index at the interface of two materials. The moth-eye structure has a repeating period typically in the range 200-400 nm and a height typically in the range 250-350 nm. An array of surface structures that are smaller than the wavelength of light provides an effectively continuous transition of the refractive index rather than an abrupt change, and reflection is minimised. These structures will therefore reduce reflection even when formed in a reflective surface, e.g. even when coated in a metal reflector layer. This was described in “Artificial Media Optical Properties—Subwavelength Scale” published in the Encyclopaedia of Optical Engineering (ISBN 0-8247-4258-3), Sep. 9, 2003, pages 62-71. Hence, these structures can be directly formed into the surface of the array of reflective elements and simultaneously with the relief structure defining the reflective elements themselves and the relief structure defining the non-dispersive colour-generating structure. Therefore, the blacks provided by minimal reflected light can be registered to the colours provided by the non-dispersive colour-generating structure and registered to individual reflective elements of the array of reflective elements.

Again, these anti-reflective microstructures typically have very small dimensions and so these can contribute to very high resolution imagery of the first and second images. For example, preferably, at least one of the reflective elements of the first set of reflective elements comprises both the anti-reflective microstructure and the non-dispersive colour generating structure, preferably a subset of the first set of reflective elements each comprise both the anti-reflective microstructure and the non-dispersive colour generating structure. Similarly, preferably, at least one of the reflective elements of the second set of reflective elements comprises both the anti-reflective microstructure and the non-dispersive colour generating structure, preferably a subset of the second set of reflective elements each comprise both the anti-reflective microstructure and the non-dispersive colour generating structure.

Anti-reflective micro-structures have been found to work particularly well with plasmonic nanostructures for providing dark blacks to complement the plasmonic colours producible with these structures and so many embodiments may comprise a combination of these structures.

As indicated above, the first image may be at least partly defined by the arrangement of the first set of reflective elements across the security device, and/or the second image may be at least partly defined by the arrangement of the second set of reflective elements across the security device. Alternatively, or additionally, the first image may be at least partly defined by the modulation of the non-dispersive colour generating structure across the first set of reflective elements, and/or the second image may be at least partly defined by the modulation of the non-dispersive colour generating structure across the second set of reflective elements. Additionally, the first image may be at least partly defined by the arrangement of anti-reflective micro-structures across the first set of reflective elements, and/or the second image may be at least partly defined by the arrangement of anti-reflective micro-structures across the second set of reflective elements.

In many embodiments the first and/or second sets of reflective elements comprises an array of substantially planar reflective elements. This is, of course, referring to the shape of the reflective element itself, ignoring any microscopic variation owing to the relief of the non-dispersive colour generating structure or the anti-reflective microstructure. For example, the reflective elements may resemble reflective facets. Effectively planar reflective elements will each reflect light in substantially one direction. This can help provide image switches, where one image is visible over a range of viewing angles before becoming invisible, and replaced by a different image. In other embodiments, the first and/or second sets of reflective elements may comprise an array of concave or convex reflective elements, again ignoring surface contributions from the non-dispersive colour generating structure or the anti-reflective microstructure. Such shapes of individual reflective elements provide further means of controlling the direction in which light is reflected. For example, convex reflective elements may act to widen the viewing zone of the image, helping to minimise the range of viewing positions at which no image is clearly visible. In one particularly preferred embodiment, a series of two or more viewing zones, from corresponding sets of reflective elements, are provided next to one another along one tilt direction of the security device and the corresponding sets of reflective elements are convex reflective elements, being convex in said tilt direction. The image from each of said sets of reflective elements may represent a different perspective of the same 3D object, such that tilting between the viewing zones gives the impression of a rotation of the 3D object. In such an embodiment, the convex reflective elements may help prevent the image from disappearing as the viewer moves between viewing zones. This may prevent an apparent flickering as the image changes between different views of the 3D object and give the impression of a smooth rotation of the 3D object as the device is tilted. Here, each set of reflective elements may collectively reflect light in a convergent or divergent manner.

As has been made clear above the present claims require that the first set of reflective elements directs light towards the first viewing zone so that it is converging or diverging in at least one direction. In some cases, the first set of reflective elements is configured to collectively direct incident light convergently or divergently towards the first viewing zone of the first image such that the light converges or diverges along a first direction and a second direction orthogonal to the first direction. Preferably, light converges or diverges along substantially all directions orthogonal to the viewing direction. Such embodiments provide the advantages associated with converging or diverging effects, as described above, in two orthogonal directions of tilt. For example, light convergent along two orthogonal directions may provide bright imagery that distinctly switches off as the device is tilted beyond the first viewing zone, enabling for clear and discrete image switches. On the other hand, light divergent along two orthogonal directions may provide imagery that persists for larger viewing angle ranges, and so can be authenticated more quickly.

In other embodiments, the first set of reflective elements may be configured to collectively direct incident light towards the first viewing zone such that light converges along a first direction and diverges along a second direction orthogonal to the first direction such that the first viewing zone is larger along the second direction than it is along the first direction. As indicated above, this can increase brightness and provide more rapidly switching images along one direction of tilt of the security device, while providing relative invariability in of the images in an orthogonal direction of tilt, or analogously as illumination angle varies in the orthogonal direction.

In some embodiments, the first and second sets of reflective elements are configured such that the first and second viewing zones substantially do not overlap, such that an image switch effect is observed upon a viewer moving between the first viewing zone and the second viewing zone. That is, the first image is visible in the first viewing zone and the second image is not, and the second image is visible in the second viewing zone and the first is not.

It may be preferred that the second set, and any other sets, of reflective elements have the same convergent or divergent properties as the first set, so that there is consistency in the imagery of the device; however, this is not essential. In some embodiments, the first set may be convergent and the second set divergent, so that different types of effect are provided by these structures.

For example, in some embodiments, the first set of reflective elements is configured to collectively direct incident light towards the first viewing zone such that light converges along a first direction, and the second set of reflective elements is configured to collectively direct incident light towards the second viewing zone such that light diverges along the first direction. One way such an arrangement could be used is where the first and second sets of reflective elements are configured such that the first and second viewing zones overlap, and preferably the first viewing zone lies entirely within the second viewing zone along the first direction such that both the first and second images are visible across the whole first viewing zone at least along the first direction. Here, as the security device is tilted along the first direction, we would have the second image become visible as the viewer reaches the second viewing zone. This second image would persist as the viewer reaches the first viewing zone, at which point the first image would become visible in combination with the second image. Further tilting would cause the first image to become invisible again before the second image also becomes invisible.

As mentioned above, the present invention is not limited to only two sets of reflective elements and indeed preferably, the array of reflective elements further comprises a third set of reflective elements, wherein the first, second and third sets of reflective elements are regularly or irregularly interlaced along at least the first interlacing direction across the first area of the security device, and wherein the non-dispersive colour-generating structure is additionally provided in the surface of third set of reflective elements, wherein the third set of reflective elements is configured to collectively exhibit a third image across the first area of the security device to a viewer within a third viewing zone different from the first and second viewing zones, wherein preferably the third set of reflective elements is configured to collectively direct incident light convergently and/or divergently towards the third viewing zone of the third image. Preferably, the non-dispersive colour-generating structure is modulated across the third set of reflective elements such that the third image includes multiple colours. Similarly, a fourth set of reflective elements may be provided, and further sets, as desired.

The provision of additional sets of reflective elements increases the complexity of the device, allowing for more different images to be displayed. There is also the possibility for more of the above mentioned combinations of converging and/or diverging sets of reflective elements.

According to a second aspect of the invention, there is provided a security document including a security device according to the first aspect of the invention, wherein the security document is preferably selected from banknotes, passports, cheques, identity cards, certificates of authenticity, fiscal stamps and other document for securing value or personal identity.

Advantageously, a plurality of security documents may be provided, wherein the array of reflective sampling elements and the non-dispersive colour-generating relief structure are registered to one another such that they have substantially the same relative positioning on each of the plurality of security documents. This consistent relative positioning ensures a consistency in appearance of the security devices on the security documents so that counterfeits can be more easily recognised by a viewer.

According to a third aspect of the present invention, there is provided a method of manufacturing a security device comprising: providing an array of reflective elements including at least a first set of reflective elements and a second set of reflective elements, the first and second sets of reflective elements being regularly or irregularly interlaced along at least a first interlacing direction across a first area of the security device; providing a non-dispersive colour-generating structure in the surface of first and/or second sets of reflective elements; wherein the first set of reflective elements is configured to collectively exhibit a first image across the first area of the security device to a viewer within a first viewing zone and wherein the second set of reflective elements is configured to collectively exhibit a second image across the first area of the security device to the viewer within a second viewing zone different from the first viewing zone; wherein the non-dispersive colour generating structure is modulated across the first and/or second sets of reflective elements such that the first and/or second images include multiple colours; and wherein the first set of reflective elements is configured to collectively direct incident light convergently and/or divergently towards the first viewing zone of the first image.

This corresponds to a method of manufacturing the security device of the first aspect of the invention, and so all of the above explanation applies equally to this method.

Preferably, providing the array of reflective elements comprises forming a reflective element relief structure in a formable layer defining the array of reflective elements, and wherein providing the non-dispersive colour-generating structure in the surface of first and/or second sets of reflective elements comprises forming the formable layer to define the non-dispersive colour-generating structure, and wherein preferably the reflective element relief structure and the non-dispersive colour-generating structure are formed in the same forming step. The reflective elements will typically be completed by the application of a reflector layer, such as a metal layer, for example by a directional deposition technique.

An example of a suitable formable layer would be a curable material and the step of forming the formable layer would be performed using a cast-cure process.

Where the non-dispersive colour-generating structure comprises an array of plasmonic nanostructures, and the method preferably comprises coating the formable layer with a metal layer, such as aluminium, and where the non-dispersive colour-generating structure comprises a zero order diffractive structure, the method preferably further comprises coating the formable layer with a transparent high refractive index layer.

BRIEF DESCRIPTION OF THE DRAWINGS

The present invention will now be described with reference to the following drawings, of which.

DETAILED DESCRIPTION

An embodiment of a security device will now be described with reference to FIGS. 1 to 6B.

Figure 1:
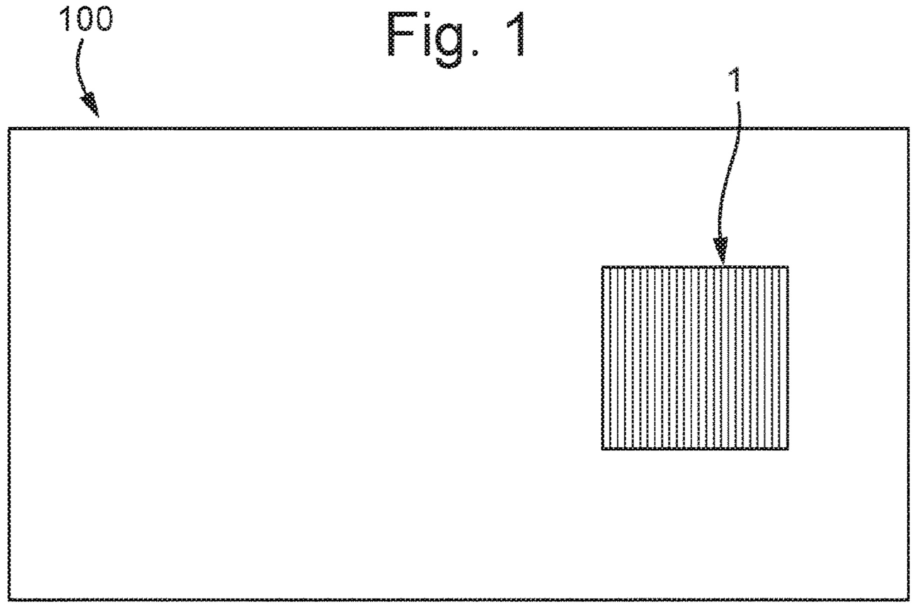
FIG. 1 shows, schematically, a security document carrying a security device according to an embodiment.

FIG. 1 shows a security document 100, in this case a banknote, carrying a security device 1. The banknote may be, for example, a polymer banknote comprising a transparent polymer substrate coated in one or more opacifying layers and then suitably printed. The security device 1 may be provided in a window or half window on the security document and may be formed directly into the security document substrate or may be formed in a layer of formable material applied to the security document substrate. The security device may be provided on the security document during manufacture of the security document, or may be applied subsequently, e.g. by subsequent adhesion or stamping onto the security document.

The present security device 1 is configured to guide light in a convergent manner towards a number of predetermined viewing zones so as to generate images for viewing by a viewer. In all present embodiments, the image displayed by a security device will depend upon the relative positioning of an illuminating light source and the security device, as well as the relative positioning of the viewer. It will be appreciated that where the present disclosure makes reference to rotation or tilting of the security device, the same effect could be achieved by moving either the illuminating light source or the viewer.

Figure 2:
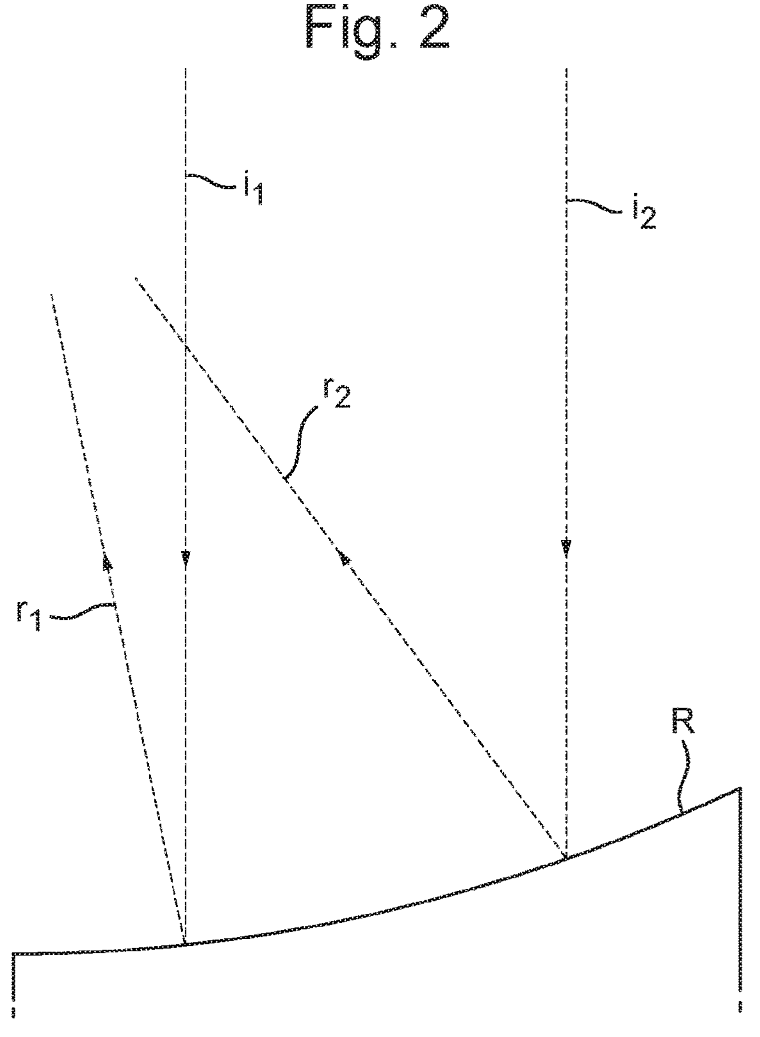
FIG. 2 shows, schematically, a concave reflective surface, illustrating an underlying principle of the invention.

FIG. 2 illustrates an underlying concept of the present invention. In particular, this Figure shows a concave reflective surface R and illustrates the effect that this surface will have on incident light. Two parallel incident light rays $i_1$, $i_2$ are shown in FIG. 2, each incident at a different location on the concave surface. These light rays are reflected by the concave surface R, forming two converging reflected light rays $r_1$, $r_2$. As will be explained below, the present embodiment provides sets of reflective elements that have inclinations that produce a similar convergent effect on reflected light. These sets of reflected elements are configured to produce respective images using this convergent light. Since security devices are reliably inspected at no more than arm's length, and much more typically around 20 cm to 30 cm, the point of convergence can be placed behind the viewer such that the viewer sees an image formed by the convergent light. The use of convergent light provides bright images that are easily recognisable for a viewer. Furthermore, the convergent light provides smaller viewing zones at which the images are visible, so clearer and more distinct image switches can be achieved upon rotating the security device.

Figure 3:
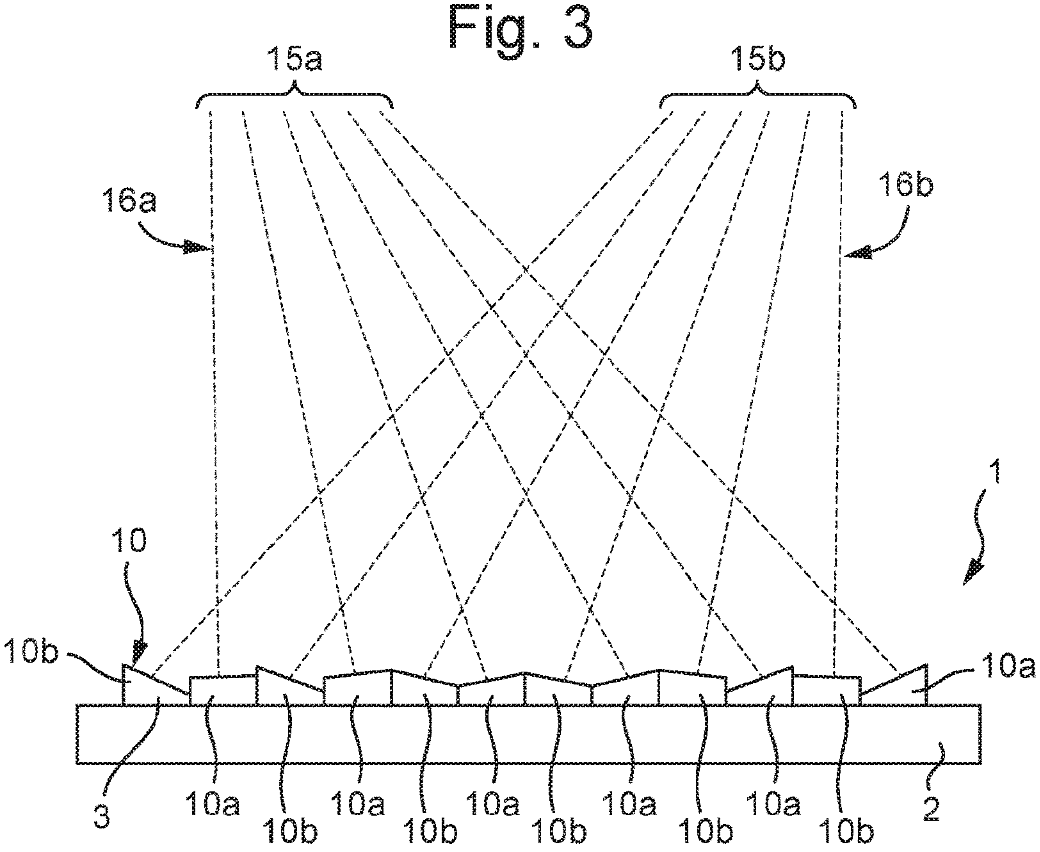
FIG. 3 shows, schematically, an enlarged cross section through the security device carried by the security document of FIG. 1.

FIG. 3 shows a schematic cross section through the security device 1. The security device comprises a support layer 2 that carries an array of reflective elements 10 formed into a formable layer 3 carried on the support layer. The formable layer 3 may be, for example, a cured curable material that has been cast to define the array of reflective elements and a non-dispersive colour-generating structure 20, shown in FIGS. 6A and 6B, in the surface thereof. The formable layer may be coated in a reflective layer 4, again shown in FIGS. 6A and 6B, for example by a deposition technique, such as vapour deposition, so as to render the reflective elements reflective and the non-dispersive colour-generating structure active.

The array of reflective elements 10 shown in FIG. 3 includes a first set 10*a* and a second set 10*b*. The reflective elements are shown in plan view in FIG. 4 and it can be seen that each reflective element is elongate, extending along the full length of the security device 1. The first and second sets of reflective elements 10*a*, 10*b* are interlaced along a first interlacing direction, being the direction orthogonal to their length, i.e. along the width direction of the security device 1. In this embodiment, the interlacing of the reflective elements is regular, by which it is meant that reflective elements of the first and second sets 10*a*, 10*b* alternate along the interlacing direction. However, this is not essential, as has been mentioned above, provided there is at least one reflective element from each set at least every 1000 μm so that the image can be discerned, with a reflective element from each set at least every 100 μm providing an image that appears substantially continuous to the naked eye.

Figure 4:
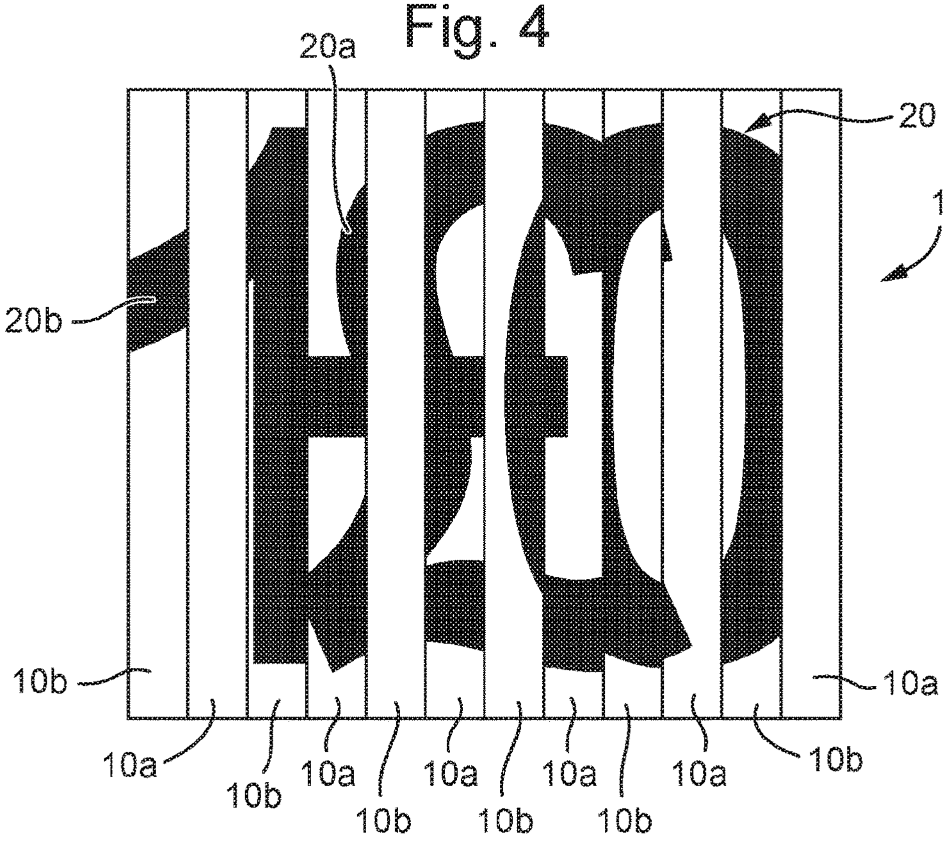
FIG. 4 shows, schematically, a plan view of the security device carried by the security document of FIG. 1.

In FIGS. 3 and 4, the security device is shown as comprising only twelve reflective elements, with six in each set; however, it will be appreciated that this is merely schematic and the small number of reflective elements shown is only so that the construction of the device can be clearly illustrated. Typically, each set of reflective elements will include tens or hundreds of reflective elements on the micron scale, with the primary restriction on the minimum size of the reflective elements resulting from the desire to avoid any significant diffractive effects being produced by the arrays of reflective elements.

As can be seen best in FIG. 3, the orientation of the reflective elements of the first set 10*a* varies across the security device so that, collectively, the first set of reflective elements 10*a* emulates the concave reflective surface shown in FIG. 2. For example, the reflective element of the first set 10*a* shown at the left-hand side of FIG. 3 has an orientation almost parallel with the plane of the security device 1, while the element on the right-hand side of FIG. 3 has a steeper inclination towards the left of the security device. The same is true in reverse for the second set of reflective elements 10*b*, with the element on the right-hand side being almost parallel with the plane of the security device and the leftmost element having a steeper inclination towards the right of the security device 1. It will be appreciated that the orientations shown in FIG. 3 are exaggerated to illustrate the underlying concept and that the precise orientations will be configured depending on the desired size and position of the corresponding viewing zones.

FIG. 3 shows the effect these orientations of the reflective elements of the first and second sets 10*a* and 10*b* have on incident light. Incoming light is not shown in FIG. 3 for clarity, but can be assumed that light is incoming along a direction generally perpendicular to the plane of the device 1. As can be seen in this Figure, each of the first set of reflective elements 10*a* directions light 16*a* towards a first viewing zone 15*a*, which is a position at which the device is configured for viewing, such that light 16*a* is converging towards this first viewing zone. Similarly, each of the second set of reflective elements 10*b* directions light 16*b* towards a second viewing zone 15*b*, which is a position at which the device is configured for viewing, such that light 16*b* is converging towards this second viewing zone 15*b*. It is the gradually varying orientation of the reflective elements across the respective sets, which emulate a concave reflective surface, that produces the converging effect. It will be noted that, in practice, the security device will not be illuminated only along one direction by strictly parallel light rays, and the convergent effect will nonetheless apply in more diffuse lighting conditions and ensure that the complete sets of reflective elements may be visualised by the viewer. As can be seen in the Figure, in this embodiment, the first and second viewing zones are separated from one another such that rotation of the security device 1 about an axis lying along the elongate direction of the reflective elements will switch between the first and second viewing zones.

It should be noted that the orientation of the reflective elements may vary along their length, or may be consistent. For example, the reflective elements may emulate a reflective surface that is concave in two orthogonal directions, such that light converges in both a horizontal direction and a vertical direction when the security device is oriented vertically. Alternatively, the reflective elements may be convex in the vertical direction so as to cause light to diverge in the vertical plane, thereby decreasing the sensitivity of the device to vertical tilt angles.

As can be seen in FIG. 4, the reflective elements 10 carry a non-dispersive colour-generating structure 20. In this case, the first set of reflective elements 10*a* carry a non-dispersive colour-generating structure 20*a* having a first set of characteristics, and the second set of reflective elements 10*b* carries a non-dispersive colour-generating structure 20*b* having a second set of characteristics. The result is that light reflected from the first set of reflective elements 10*a* in the region of the non-dispersive colour-generating structure 20*a* will have a first colour and light reflected from the second set of reflective elements 10*b* in the region of the non-dispersive colour-generating structure 20*b* will have a second colour different from the first colour. This regional colouring is used to provide the individual reflective elements with corresponding "slices" of an image to be displayed by each set, such that when the device is viewed so that light reflects from one set towards the viewer, the slices of the corresponding image are presented and the viewer perceives a full image.

Figure 5A:
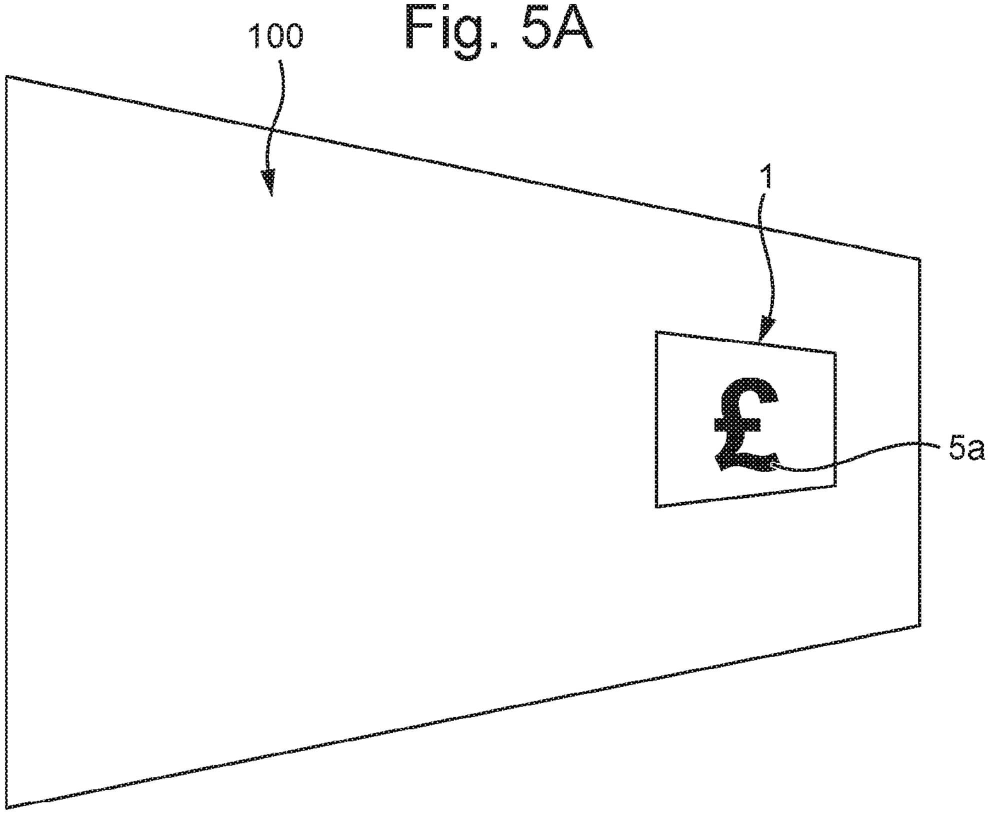
FIGS. 5A and 5B show, schematically, the security document of FIG. 1 at two different viewing positions.
Figure 5B:
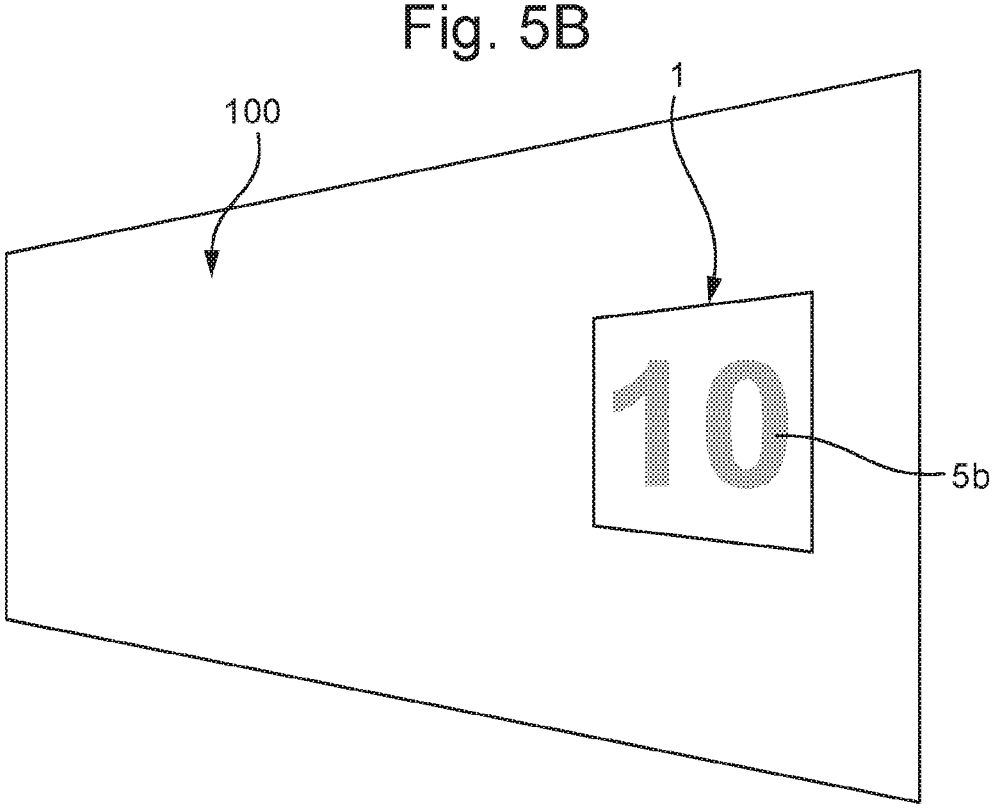

FIGS. 5A and 5B show the security document as it is viewed in the first and second viewing zones 15*a*, 15*b*. Specifically, FIG. 5A shows the appearance of the security device 1 from the first viewing zone 15*a*. Here, light from the first set of reflective elements 10*a* is being directed towards the viewer. Where the light is reflected from regions including the non-dispersive colour-generating structure 20*a*, the light is coloured a first colour, e.g. red. This regional colouring of reflected light is used to generate a first image 5*a*, in this case, a "£" symbol. Meanwhile, FIG. 5B shows the appearance of the security device 1 from the second viewing zone 15*b*. Here, light from the second set of reflective elements 10*b* is being directed towards the viewer. Where the light is reflected from regions including the non-dispersive colour-generating structure 20*b*, the light is coloured a second colour different from the first colour, e.g. blue. This regional colouring of reflected light is used to generate a second image 5*b*, different from the first image, in this case, the number "10". In alternative embodiments, either of the first and second non-dispersive colour-generating structure 20*a*, 20*b* may be modulated within the first or second set of reflective elements so that one or both of the images 5*a*, 5*b* is a multi-coloured image. For example, while relatively simple images are shown in this embodiment, the present invention may also be used to form more complex images, such as portraits, landscapes, buildings and animals, and multiple colours may be used within these images to improve the quality of the imagery.

While only two sets of reflective elements are used in this example for generating two corresponding images, it will be appreciated that more than two sets may be used for generating further corresponding images in additional viewing zones to provide a more complex device with more optical variability.

Figure 6A:
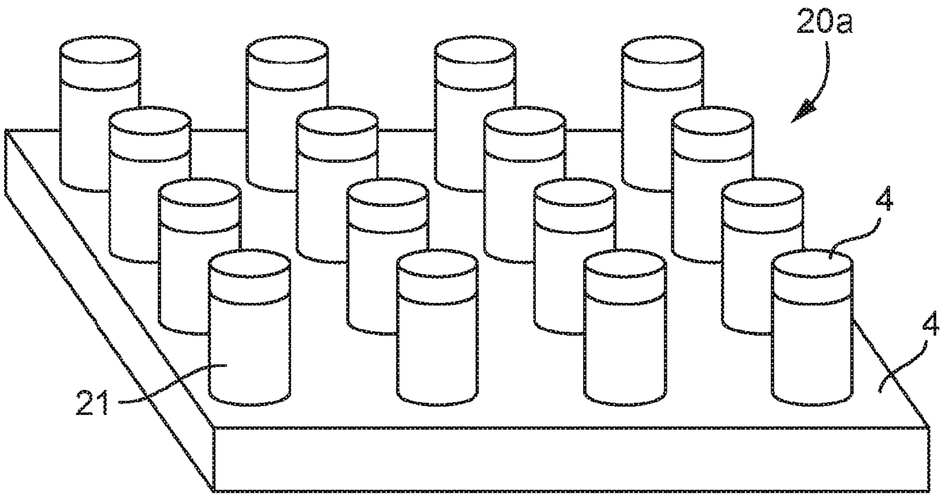
FIGS. 6A and 6B show, schematically, two different non-dispersive colour-generating structures configured to exhibit different colours, as may be used in embodiments of the present invention.
Figure 6B:
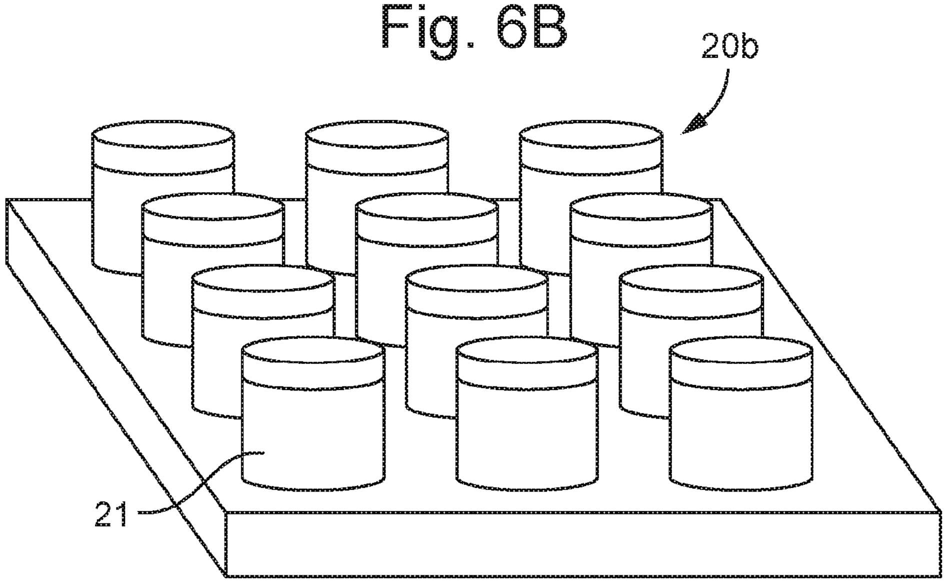

FIGS. 6A and 6B show one type of non-dispersive colour-generating relief structure suitable for use in the above described embodiment. FIG. 6A shows a non-dispersive colour-generating relief structure that may be provided across the first set of reflective elements for generating the first colour and FIG. 6B shows a non-dispersive colour-generating relief structure that may be provided across the second set of reflective elements for generating the second colour. As mentioned above, these relief structures are formed into the formable layer 3 that defines the reflective elements 10. In this case, each non-dispersive colour-generating relief structure 20*a*, 20*b* comprises an array of plasmonic nanostructures in the form of nanopillars. The shaft 21 of each nanopillar is formed out of the formable layer 3, which in this embodiment will be a dielectric layer, and preferably a curable dielectric layer. A UV curable material typically used for cast cure replication of surface relief micro-structures may be used, such as acrylated oligomers, such as acrylic esters of polyesters, polyethers, polyurethanes and epoxy resins. Typical dimensions of nanopillar include diameters between 10 and 500 nm and spacings of 50 to 500 nm. The array of nanopillar shafts 21, will typically be cast into the formable layer 3 simultaneously with the relief structure defining the reflective elements, as will be described in more detail below. The surface of the formable layer 3 is additionally coated with a metal layer 4, e.g. by a deposition technique. A metal suitable for forming a functioning array of plasmonic nanostructures should be used, such as aluminium. The metal layer is thereby received on the tops of the nanopillar shafts 21 and on the surface between the nanopillars. It will be noted that, since the local surface normal varies across the security device owing to the varying orientation of the reflective elements, many of the nanopillars will not extend perpendicular to the plane of the security device. However, a directional deposition technique will still form a functioning array of plasmonic nanopillars. This is because, where nanopillars have slight incline, their sides will be very steep, rather than vertical, and a directional deposition will therefore only thinly coat these steep sides of the nanopillars. Suitably thin coatings will form a negligible metal layer which will not impede the plasmonic effect of the final nanopillar array. This same effect will apply equally to other non-dispersive colour-generating structures that are usually formed with a directionally deposited metal or high refractive index layer, e.g. plasmonic nanohole arrays and zero order grating structures.

The colour generated by an array of plasmonic nanostructures in the form of nanopillars is dependent on the size, shape and spacing of the pillars. As shown in FIGS. 6A and 6B, the size and spacing of the nanopillars is different on the first set of reflective elements 10*a* than it is on the second set of reflective elements 10*b*, such that the different colours are produced. While the nanopillars shown in FIGS. 6A and 6B are all the same shape and size and equally spaced, it will be appreciated that the desired colour to be generated can be tuned by mixing different sizes and shapes of nanopillar and varying the spacing. Only sixteen nanopillars are shown in FIG. 6A and twelve in FIG. 6B, but it will be appreciated that many more are typically used across each reflective element to provide appropriate coverage and define corresponding portions of the images.

While this embodiment uses non-dispersive colour-generating structures to positively define the image portions on each reflective element, it would likewise be possible to negatively define the image. Furthermore, the non-dispersive colour-generating structures define the image portions against purely reflective backgrounds which carry no non-dispersive colour-generating structures; however, this is also not essential. In alternative embodiments, the non-dispersive colour-generating structures may be provided across the entire array of reflective elements so that, for example, each image is defined by coloured regions against a differently coloured background. Alternatively, the areas not including a non-dispersive colour-generating structure could be provided with an anti-reflective structure to provide a substantially black appearance to the un-coloured areas and prevent these from dominating the image in terms of brightness. An anti-reflective structure suitable for use in this way will be described in more detail below with reference to FIG. 17.

A further embodiment will now be described with reference to FIGS. 7 to 8B.

Figure 7:
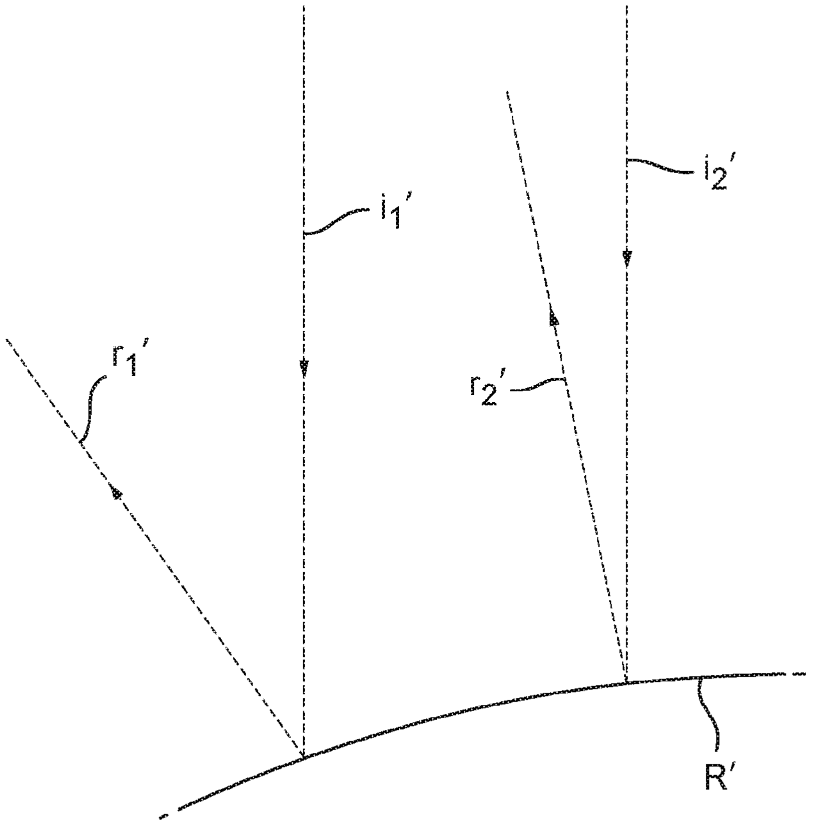
FIG. 7 shows, schematically, a convex reflective surface, illustrating an underlying principle of the invention.

Similarly to FIG. 2, FIG. 7 illustrates a convex reflective surface, which reflects light in a divergent manner and which may be emulated by one or more sets of the array of reflective elements. In particular, this Figure shows a convex reflective surface R' and illustrates the effect that this surface will have on incident light. Two parallel incident light rays $i_1'$, $i_2'$ are shown in FIG. 7, each incident at a different location on the convex surface. These light rays are reflected by the convex surface R', forming two diverging reflected light rays $r_1'$, $r_2'$. As will be explained below, the present embodiment provides sets of reflective elements that have inclinations that produce a similar divergent effect on reflected light. These sets of reflected elements are configured to produce respective images using this divergent light. The use of divergent light provides images that are distinctly visible in a wider range of illumination and viewing conditions and so visible over a wider range of viewing positions.

Figure 8A:
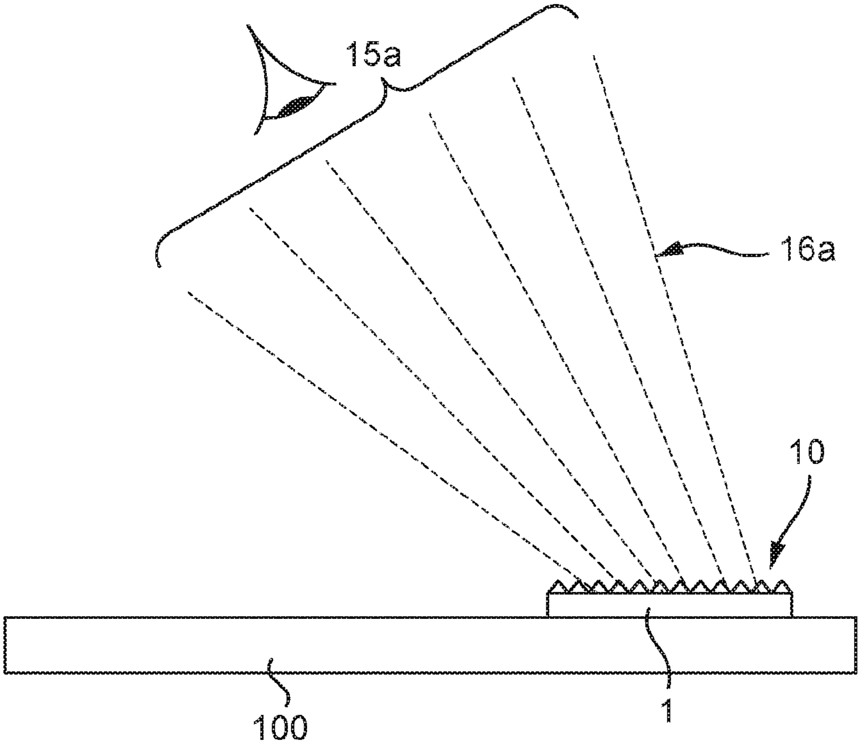
FIGS. 8A and 8B show, in schematic cross sections, a security document carrying a security device according to an embodiment being viewed at two different positions.
Figure 8B:
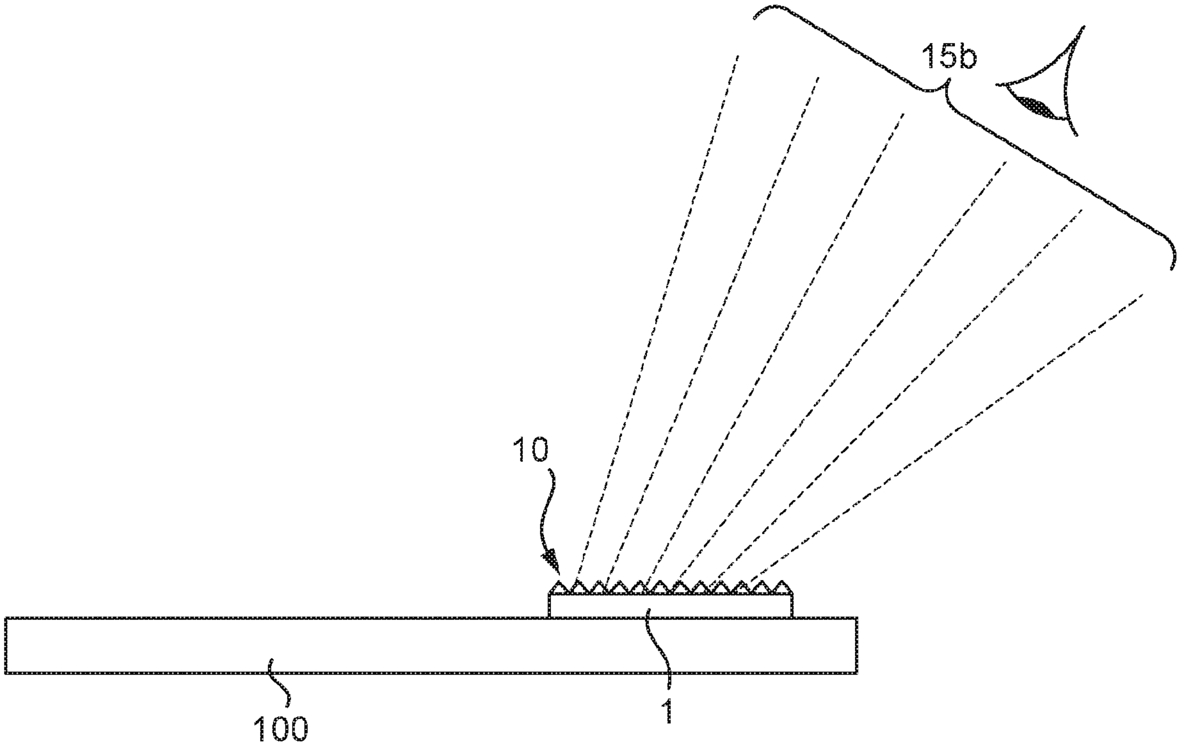

FIGS. 8A and 8B show cross-sections through a security document 100 carrying a security device 1. The security device 1 may be configured in the same manner described above with reference to FIGS. 1 to 6B, but with the orientations of the reflective element varying so as to emulate a convex rather than concave surface. FIGS. 8A and 8B illustrate the effect such a change will have on the viewing zones 15*a*, 15*b* corresponding to the first and second sets of reflective elements 10*a*, 10*b*.

FIG. 8A shows the security device 1 being viewed by a viewer in the first viewing zone 15*a*. As can be seen here, the light 16*a* reflected from the first set of reflective elements 10*a* is diverging as it travels away from the security device 1. Again, it will be noted that, in practice, the security device will not be illuminated only along one direction by strictly parallel light rays, and the divergent effect will increase the number of viable viewing positions of the security device in more diffuse lighting conditions, with the whole of each set of reflective elements being visible.

Similarly, FIG. 8B shows the security device 1 being viewed by a viewer in the second viewing zone 15*b*. Again, the light 16*b* reflected from the second set of reflective elements 10*b* is diverging as it travels away from the security device 1, which acts to increase the number of viable viewing positions relative to a set of parallel reflective elements. As can be seen comparing FIGS. 8A and 8B, the first and second viewing zones 15*a*, 15*b* are configured so as to not overlap, with the first viewing zone 15*a* making up a large part of the appearance of the device from tilt angles left of normal to the device and the second viewing zone 15*b* 15*a* making up a large part of the appearance of the device from tilt angles right of normal to the device. Therefore, as compared with the previous embodiment, an image switch may still be perceived by the viewer, but the images may persist over a longer range of viewing positions and there may not be as clear a divide between the two images as the viewer tilts the device through a normal viewing position.

Figure 9A:
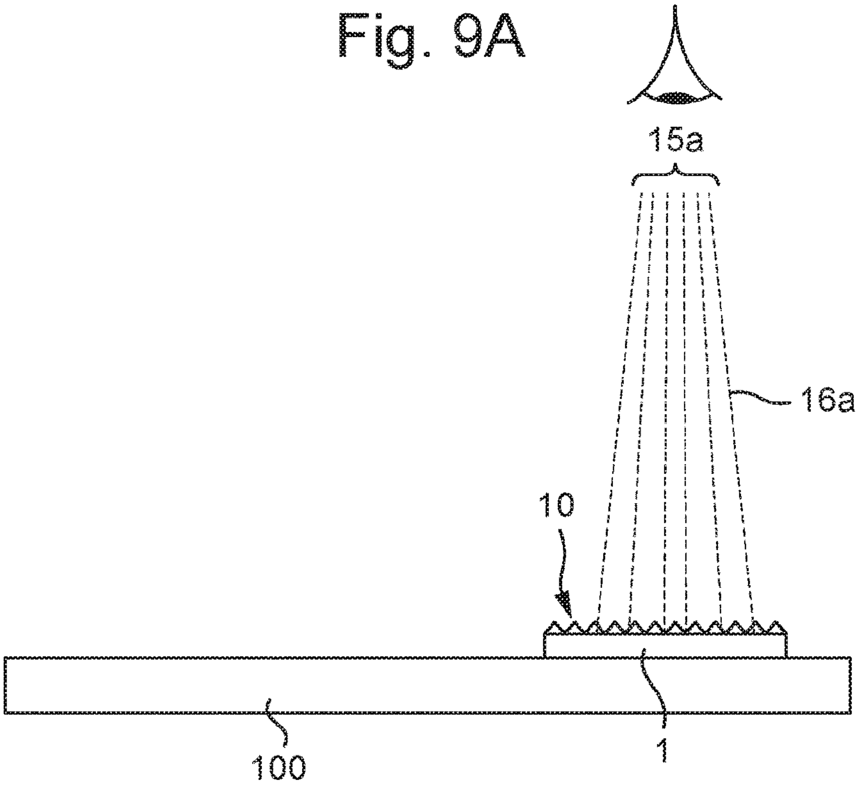
FIGS. 9A and 9B show, in schematic cross sections, a security document carrying a security device according to an embodiment being viewed at two different positions.
Figure 9B:
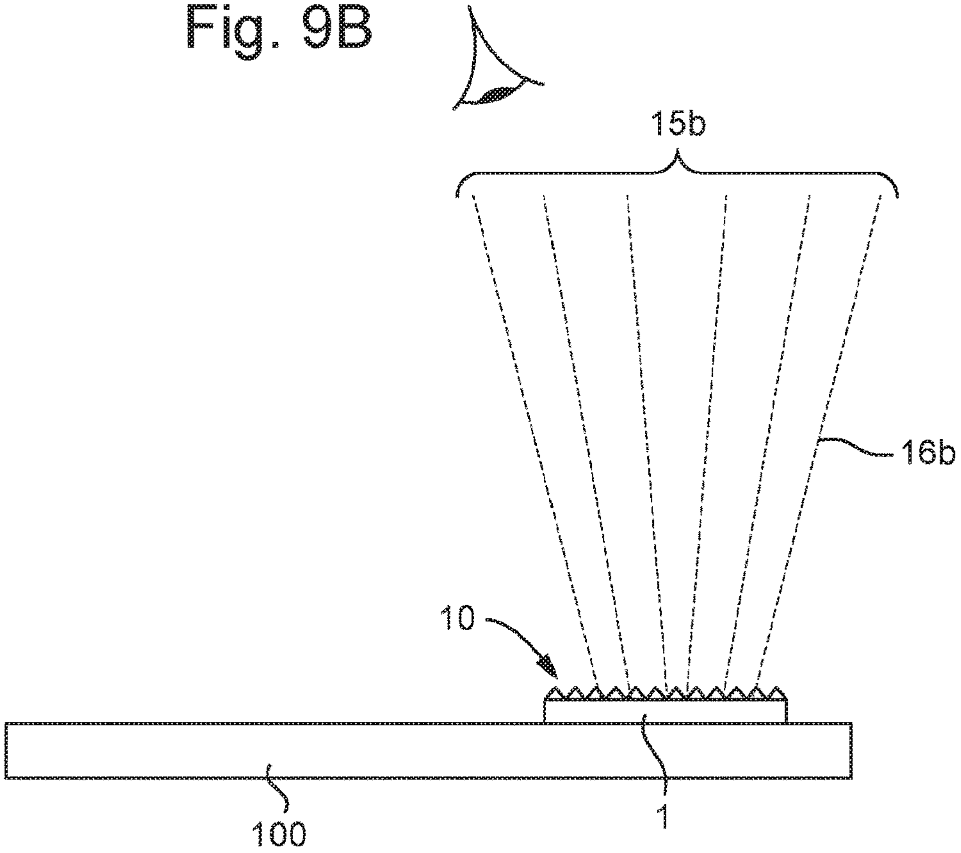

FIGS. 9A and 9B illustrate an embodiment which uses both concave and convex-type sets of reflective elements in the array of reflective elements 10. In particular, as shown in FIG. 9A, the first set of reflective elements 10*a*, which direct light towards the first viewing zone 15*a*, emulate a concave reflective surface and reflect light 16*a* in a converging manner towards the first viewing zone. In this embodiment, the first set of reflective elements 10*a* is configured to reflect light such that the first viewing zone 15*a* is centred on a normal viewing position, i.e. perpendicular to the plane of the security device. For example, the reflective elements towards the centre of the security device may be closer to parallel with the plane of the security device, while those reflective elements near the left and right edges of the device have steeper orientations facing more towards the centre of the device. The first image may thereby be visible across the first viewing zone 15*a*, within relatively small tilt angles away from the normal viewing direction. Meanwhile, as shown in FIG. 9B, the second set of reflective elements 10*b*, which direct light towards the second viewing zone 15*b*, emulate a convex reflective surface and reflect light 16*b* in a diverging manner towards the second viewing zone. Again, the second set of reflective elements 10*b* is configured to reflect light such that the second viewing zone 15*b* is centred on the normal viewing position. The second image may thereby be visible across the second viewing zone, within relatively large tilt angles away from the normal viewing direction, albeit with reduced brightness as compared with the first image.

When a viewer views the security device 1 of FIGS. 9A and 9B, at a normal viewing position, they may see a superposition of the first and second images, with the first image possibly appearing brighter than the first owing to the converging effect the first set of reflective elements 10*a* has on light. As the security device 1 is tilted away from a normal viewing position, the first image may cease to be visible as the viewer moves outside of the first viewing zone 15*a*, while the second image persists in isolation. Such an embodiment may provide that the first and second images cooperate. For example, the second image may depict a landscape and the first image may depict buildings within the landscape such that two levels of imagery are provided by the security device. Furthermore, this layered approach to imagery may aide the viewer in finding the correct viewing position. That is, the large viewing zone of the second image may define an easy to find boundary within which the viewer may then further rotate the device to locate the brighter and more visually striking first image.

Figure 10:
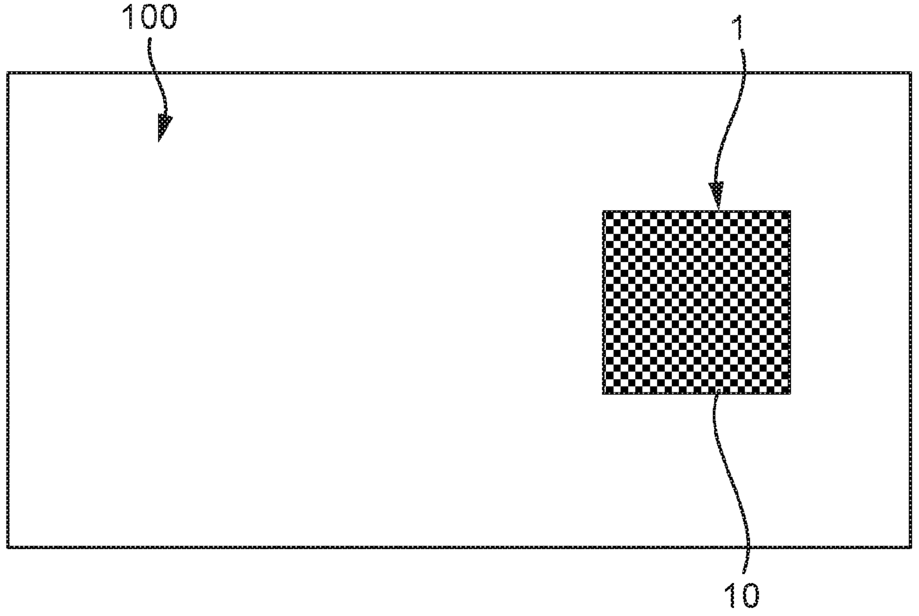
FIG. 10 shows, schematically, a security document carrying a security device according to an embodiment.

The above embodiments have focussed on the use of elongate reflective elements that are interlaced along one direction only; however, the invention applies equally to smaller reflective elements interlaced in two orthogonal directions. Such an embodiment will now be described with reference to FIGS. 10 to 11B.

Figure 11A:
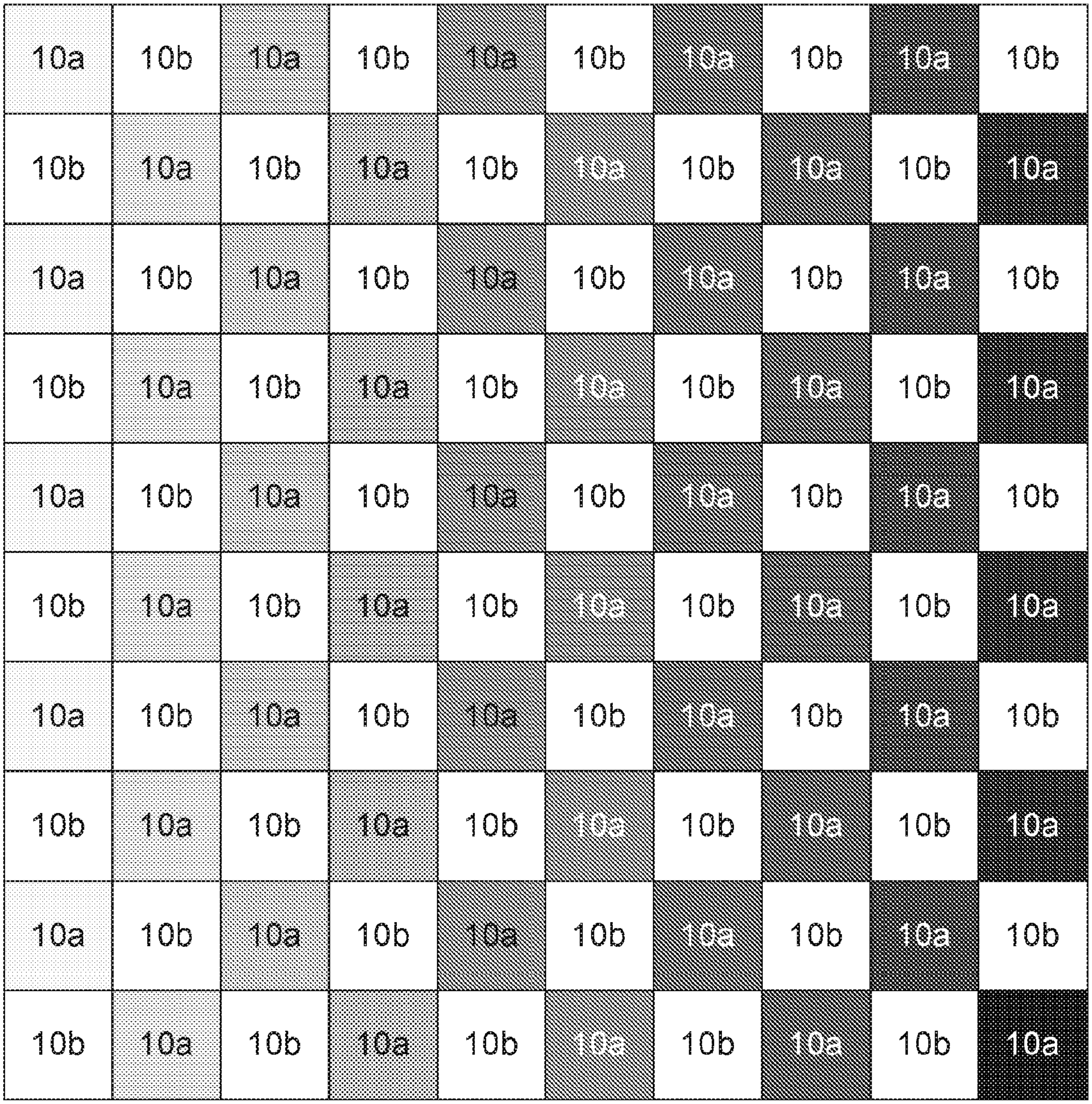
FIGS. 11A and 11B show, schematically, portions of the security device carried by the security document of FIG. 12 in enlarged plan view, with two different alternative arrangements of reflective elements.

FIG. 10 again shows a security document 100 carrying a security device 1. In this embodiment, the security device 1 carries an array of reflective elements 10 comprising first and second sets 10*a*, 10*b*. However, in this embodiment, each reflective element is a substantially square reflective element. FIG. 11A shows an interlacing arrangement of the first and second sets of reflective elements 10*a*, 10*b*. In particular, this shows a regular interlacing of the first and second sets of reflective elements 10*a*, 10*b* in first and second orthogonal interlacing directions. Here, the first and second sets of reflective elements 10*a*, 10*b* are disposed in a checkerboard pattern arrangement, such that there is an alternating of reflective elements from the first and second sets along both the width and length directions of the security device. As above, it should be noted that a ten-by-ten arrangement is shown in FIG. 11A, but many more reflective elements will typically be used across a full security device.

As with the previous embodiments, the orientations of the reflective elements within each set vary across the security device such that, collectively, each set produces the desired converging or diverging effect on reflected light, and such that the corresponding viewing zone is positioned in the desired position. In FIG. 11A, the orientation of the first set of reflective elements 10*a* is illustrated schematically by the shading of the reflective elements. For clarity, no shading is used to illustrate the orientation of the second set, but it will be appreciated that these reflective elements will likewise vary in orientation in accordance with the desired converging or diverging effect and the position of the second viewing zone. The first set of reflective elements shown in FIG. 11A are again configured to producing a converging effect on reflected light so as to exhibit the effect across a relatively small viewing zone, substantially as shown in FIG. 3. In this case, those reflective elements towards the left-hand side of FIG. 11A have orientations almost parallel with the plane of the security device 1, while the elements on the right-hand side of FIG. 11A have a steeper inclination back towards the left of the security device, with corresponding intermediate orientations in between these two extremes. While no orientation variation is shown along the vertical direction in FIG. 11A, this could also be included in the device. For example, the reflective elements may have a concave form along the vertical direction in FIG. 11A to provide a converging effect on light in the vertical direction, further increasing brightness of the replay, or they may have a convex form along the vertical direction to reduce sensitivity to vertical orientation and display the associated image across a wider range of vertical viewing positions.

Figure 11B:
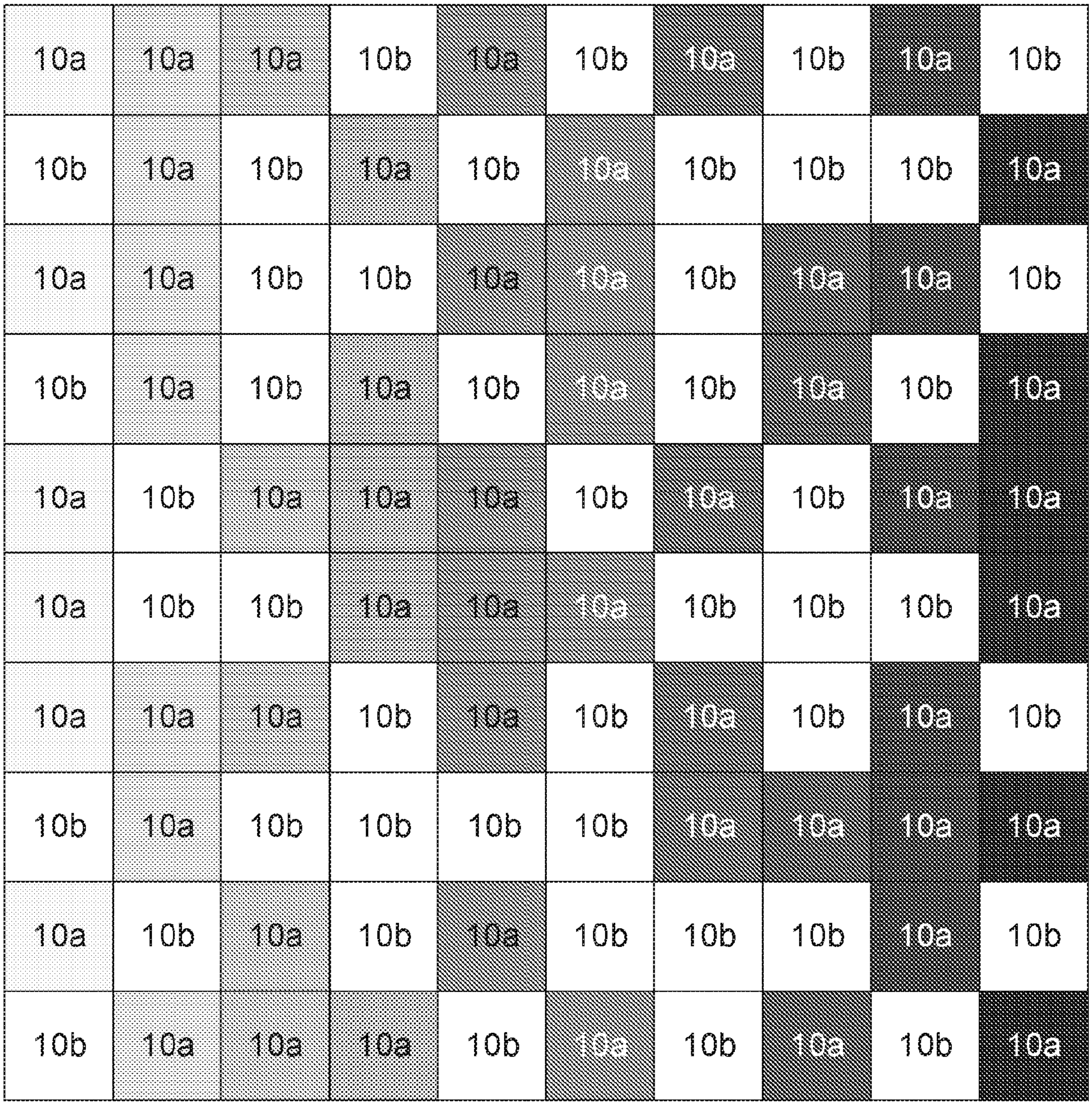

As has been indicated above, the kind of regular interlacing shown in FIG. 11A is not essential and an alternative irregular interlacing is shown in FIG. 11B. Here, the reflective elements do not alternate strictly between the first and second sets along either of the two interlacing directions. Provided that there is at least one reflective element from each set along each interlacing direction within approximately 100 μm of one another, a viewer will see a substantially continuous image across the region of the interlacing.

Such irregular interlacing may be used to increase the brightness of one image at the detriment of another in certain areas. For example, if the first image is a landscape including a sunset, it may be desirable to provide additional reflective elements within the first image in the area corresponding to the sun to increase the brightness of this area of the image. For example, rather than having a 1:1 ratio between the first and second sets in this area, it may be desirable to interlace the sets of reflective elements such that there is a greater than 1:1 ratio, e.g. 2:1 or 3:1 ratio, of reflective elements.

Whether the reflective elements are regularly or irregularly interlaced, a non-dispersive colour generating structure may be provided across each set of reflective elements in the same manner described above to provide information content of the image, with the structure being modulated either to produce multiple colours within one or each image, or to provide different images with different colours. Even with small reflective elements, such as these, which may have dimensions of less than 100 μm by 100 μm, it is possible for the non-dispersive colour-generating structure to be modulated such that some of the reflective elements individually exhibit multiple colours. For example, where the non-dispersive colour-generating structure is a plasmonic nanostructure array comprising nanopillars, the size, shape and/or spacing of the elements may be varied across the array on a scale less than the size of the reflective elements along the interlacing directions.

Figure 12:
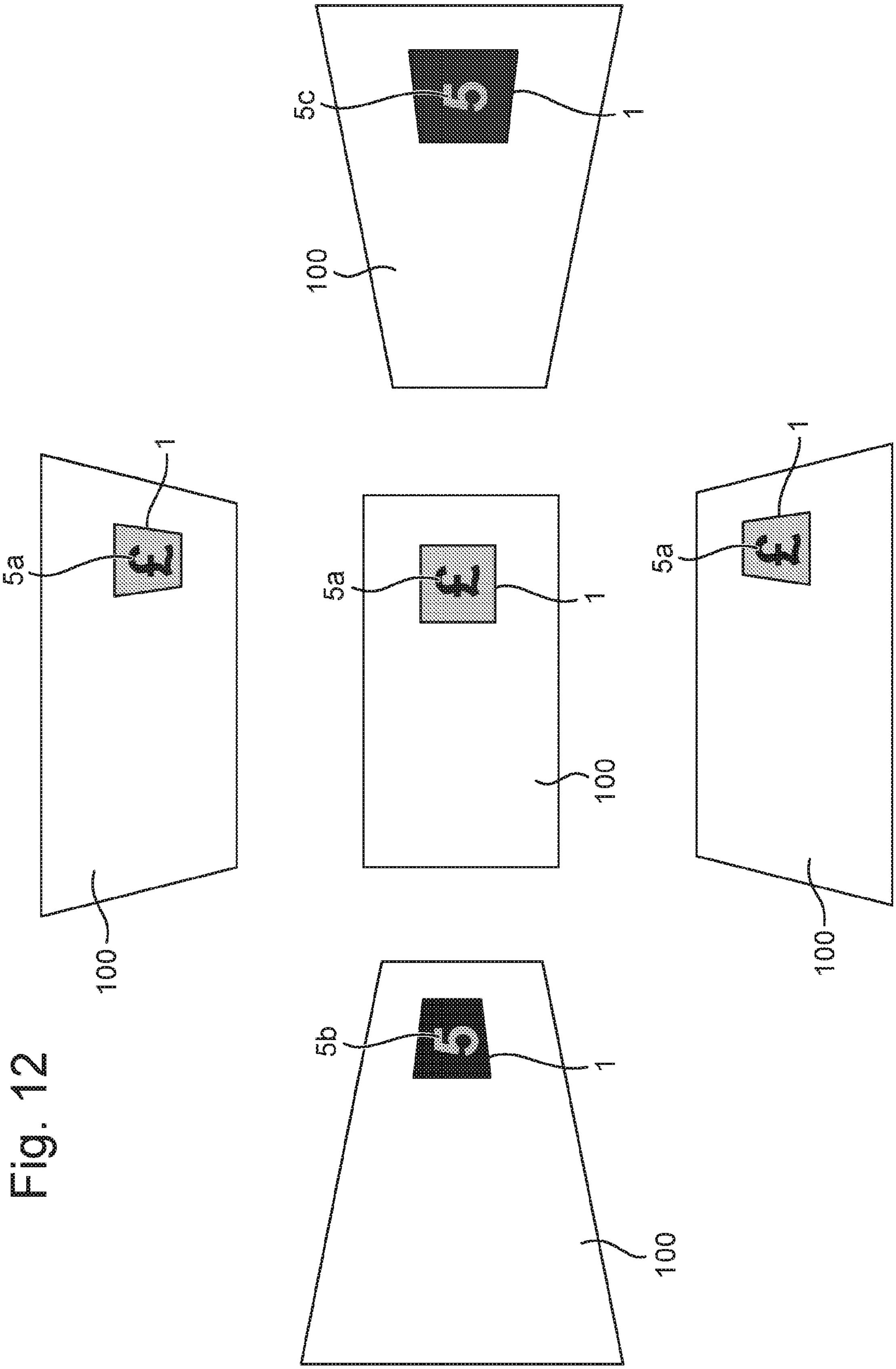
FIG. 12 shows, schematically, five different viewing positions of a security document carrying a security device according to an embodiment.

The embodiments described so far have focussed on convergence or divergence along the left-right direction. However, as has been mentioned, the converging or diverging effect would also apply to the vertical tilt direction. FIG. 12 shows an example of how this may be used in a security device provided on a security document.

FIG. 12 shows a security document 100, again a banknote, carrying a security device 1, at five different viewing positions. In the centre of FIG. 12, the appearance of the security device is shown at a normal viewing angle, i.e. perpendicular to the plane of the security device. In this embodiment, the first set of reflective elements exhibit the first image 5*a*, in this case, a coloured "£" symbol on a differently coloured background. The first set of reflective elements is configured to have an overall concave profile along the horizontal direction across the security device and a convex profile along the vertical direction across the security device. For example, the reflective elements of the first set, together, may emulate a substantially saddle-shaped reflective surface, i.e. so that reflected light is convergent along a horizontal direction and divergent along a vertical direction. The resulting viewing zone is centred on the normal, i.e. assuming a predetermined illumination angle corresponding to overhead lighting. As a result of this arrangement, as the security device is rotated about a horizontal, left-right axis, the first image 5*a* remains visible over a relatively large range of viewing positions. This is shown in the upper and lower views in FIG. 12, in which the "£" remains visible. Meanwhile, the first image will persist over a relatively short range of viewing positions as the security device is rotated about a vertical axis.

To make use of the viewing positions in left-right tilt directions in which the first image is not visible, a second and a third set of reflective elements are provided. The second set of reflective elements may have a generally concave profile across the security device along both the horizontal and vertical directions. The second set of reflective elements has its viewing zone centred left of the normal viewing direction, such that the second image 5*b*, here a coloured number "5", becomes visible as the viewer rotates the security device about its vertical axis and outside of the first viewing zone. This is shown in the left view in FIG. 12. Since the second set of reflective elements is concave in both orthogonal directions, this second image may have increased brightness, relative to the first image 5*a*, but be visible over a smaller range of viewing positions, particularly in vertical tilt directions.

As with the second set of reflective elements, the third set of reflective elements may have a generally concave profile across the security device along both the horizontal and vertical directions. In this case, the third set of reflective elements has its viewing zone centred right of the normal viewing direction, such that the third image 5*c*, again a coloured number "5", becomes visible as the viewer rotates the security device about its vertical axis and outside of the first viewing zone. In particular, the third image 5*c* will become visible as the security device is rotated so that the right-hand side is closer to the viewer, whereas the second image 5*b* becomes visible as the security device is rotated so that the left-hand side is closer to the viewer. While the second and third images 5*b*, 5*c* are shown as being identical in this embodiment, this is not essential. Each image is entirely independent of the other and may be configured as desired.

The above embodiments have focussed on cases in which the reflective elements are provided across the entire security device and the images built up by the presence and absence or modulation of a non-dispersive colour-generating structure across the reflective elements. However, the image may alternatively be defined, at least partly, by the presence and absence of reflective elements themselves. An example of such an embodiment will now be described with reference to FIGS. 13A to 13B.

Figure 13A:
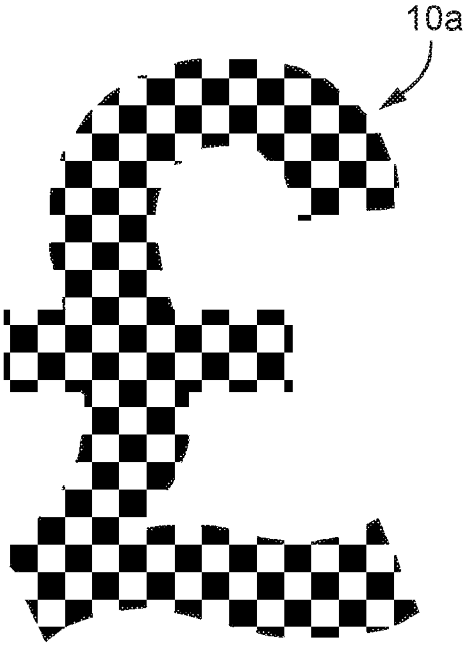
FIGS. 13A and 13B show, schematically, respective arrangements of reflective elements for delimiting respective images.

FIG. 13A shows a possible arrangement for a first set of reflective elements 10*a*. Here, instead of the reflective elements being provided across a generally square region corresponding to the boundary of the security device, the reflective elements 10*a* are arranged within an area delimiting a symbol, in this case "£". The reflective elements are positioned in a checkerboard arrangement so as to be interlaced with another set of reflective elements, described below. As with the above embodiments, the orientations of these reflective elements will vary across the set of reflective elements 10*a* such that the set produces the convergent or divergent effect on reflected light described above and directs light to an appropriately positioned viewing zone. Furthermore, the reflective elements will be provided with non-dispersive colour-generating structures across the array to provide a colour to the image generated by the reflective elements. For example, the "£" delimited by the arrangement of the reflective elements may be coloured red, or may be provided with multiple colours.

Figure 13B:
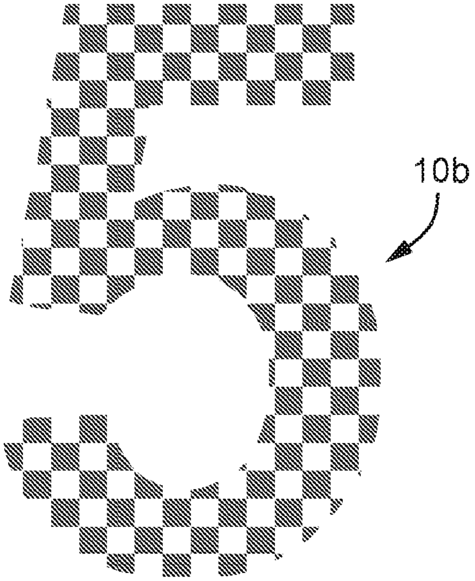

FIG. 13B shows a possible arrangement for a second set of reflective elements 10*b*. Again, the reflective elements 10*b* are arranged within an area delimiting a symbol, in this case the number "5". Here, the reflective elements are positioned in a checkerboard pattern complementary to that of the first set of reflective elements 10*a*, so that the two may be interlaced, as will be shown in FIG. 14. Again, as above, the orientations of these reflective elements will vary across the set of reflective elements 10*b* such that the set produces the convergent or divergent effect on reflected light described above and directs light to an appropriately positioned viewing zone. The reflective elements will also be provided with a non-dispersive colour-generating structure across the array to provide a colour to the image generated by the reflective elements. For example, the "5" delimited by the arrangement of the reflective elements may be coloured blue, e.g. so as to be different from a red "£" defined by the first set, or may itself be provided with multiple colours.

Figure 14:
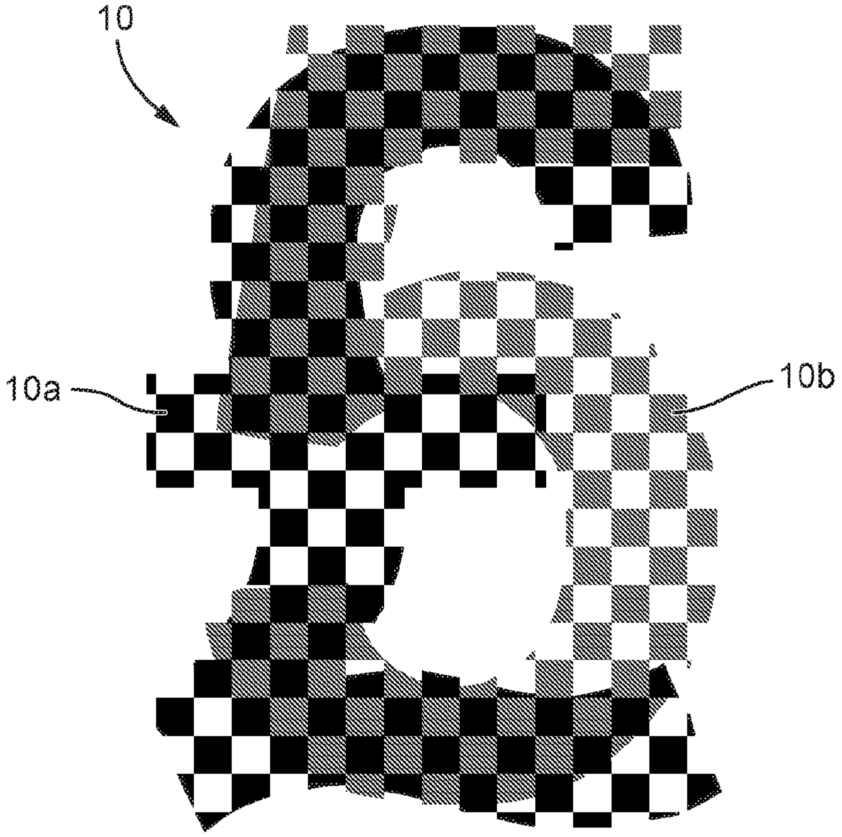
FIG. 14 shows, schematically, the interlacing of the arrangements of reflective elements shown in FIGS. 13A and 13B.

As mentioned, FIG. 14 shows the resulting arrangement of the first and second sets of reflective elements on the security device. Here, the sets are interlaced owing to their checkerboard arrangement, with only certain areas including both the first and second sets of reflective elements corresponding to the overlapping portions of the symbols "£" and "5". When this security device is viewed, the images displayed in the first and second viewing zones will be defined by bright coloured regions, corresponding to the areas in which reflective elements are present with their non-dispersive colour-generating structure.

Figure 15:
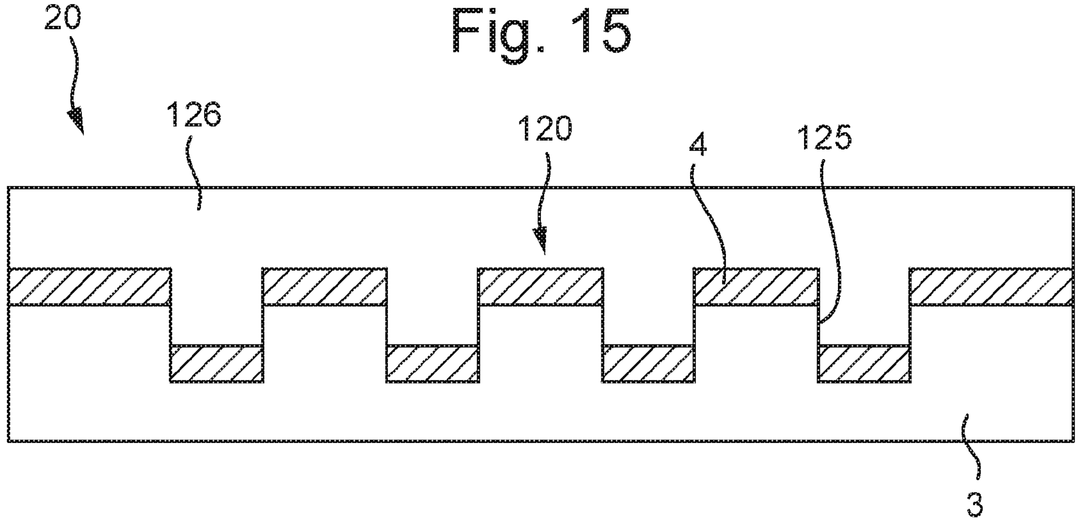
FIG. 15 shows, in schematic cross section, another non-dispersive colour-generating structure suitable for use in present embodiments.

FIG. 15 shows an alternative non-dispersive colour-generating structure 20, which may be used in the above described embodiments. Here, the structure is a zero-order diffraction grating 120. This structure comprises a transparent formable layer 3, into which is formed a rectangular grating relief structure 125. The relief structure will typically have a pitch of approximately 300 nm and a depth of approximately 400 nm, although the precise values will depend on the desired colour to be exhibited by the structure. The grating relief 125 is coated, such as by a directional deposition technique, with a transparent high refractive index material 4. This transparent high refractive index material 4 is received on the peaks and the troughs of the rectangular grating relief structure 125 and contributes to the formation of the non-dispersive colour-generating relief structure, while also providing a high reflectivity of the reflective elements in which the grating relief structure 125 is formed. The transparent high refractive index material 4, (such as ZnS) will typically be applied with a thickness of approximately 150 nm. Finally, the structure is overcoated with a transparent conformal layer 126 that substantially matches the refractive index of the formable layer 3.

The arrangement shown in FIG. 15, when illuminated with white light, will exhibit a colour without exhibiting diffractive dispersion. The precise colour exhibited by the zero order diffractive structure will be determined by the grating depth to pitch ratio, the index difference between high and low material and the thickness of the high index lamella. These properties may therefore be varied to provide the required modulation of the structure for generating different colours.

Figure 16:
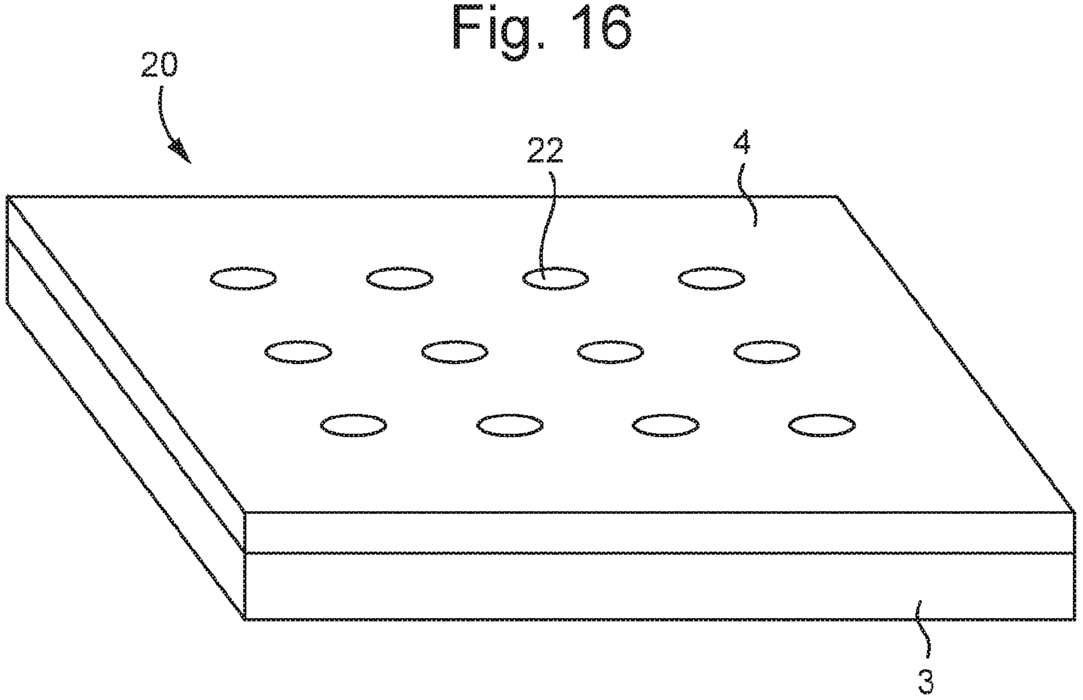
FIG. 16 shows, in schematic perspective view, another non-dispersive colour-generating structure suitable for use in present embodiments.

FIG. 16 shows another alternative non-dispersive colour-generating structure 20, which may be used in the above described embodiments. In particular, this Figure shows a different type of plasmonic nanostructure to that described above with reference to FIGS. 6A and 6B, that is, an array of nanoholes. A continuous layer of dielectric material is provided as formable layer 3, which is the layer used to define the array of reflective elements 10. The layer of dielectric material 3 is then coated on its upper surface in a layer of metal 4. The metal layer 4 includes an array of circular holes 22 formed through the metal layer, exposing the dielectric layer. This structure may be formed by providing corresponding holes extending part way into the dielectric material 3 and then coating this relief with a metal layer such that the metal is received in the holes and on the areas surrounding the holes. This structure produces plasmonic colour effects in much the same way described above with respect to nanopillar structures. Again, the shape of the holes, the size of the holes and their spacing can be varied in order to control the colour generated by these plasmonic nanostructures. These parameters may therefore be varied to provide the modulation needed to generate multiple colours.

Figure 17:
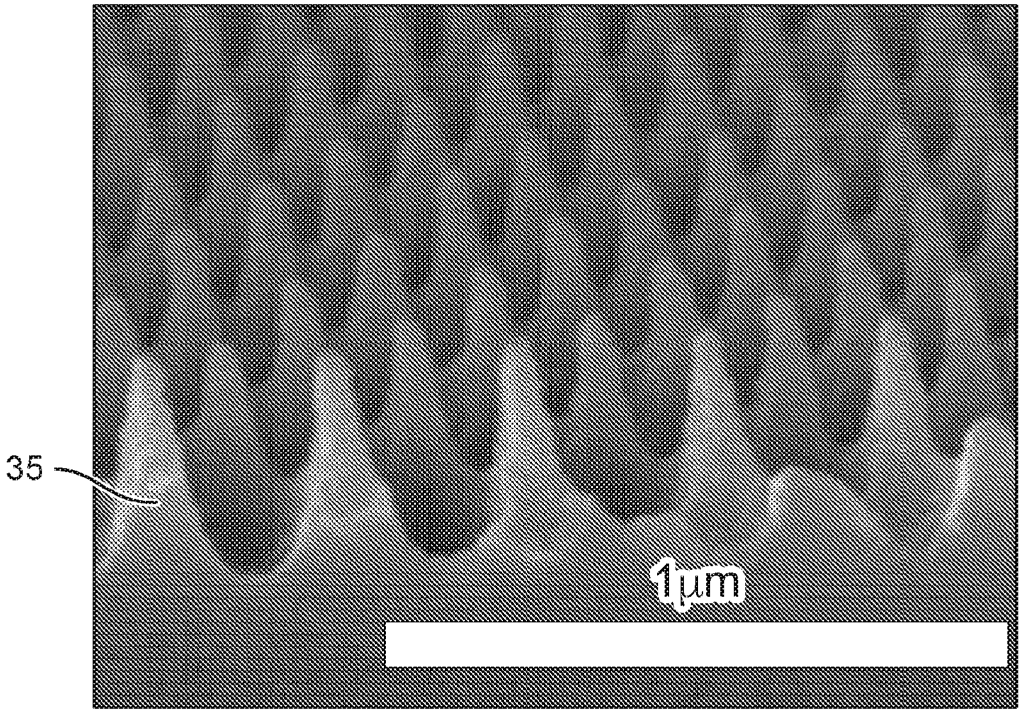
FIG. 17 shows an image of an anti-reflective relief structure suitable for use in present embodiments.

FIG. 17 is an image of an array of anti-reflective nanostructures 35. As can be seen in this image, each nanostructure comprises a post that tapers from a relatively wide base to a relatively narrow point. Such a structure may be formed directly in the surface of the formable material that defines the array of reflective elements 10. This structure works by providing an interface between two materials that has an average refractive index that varies gradually along the direction of light propagation. Such gradually varying refractive index minimises reflection of incident light rays. Furthermore, this principle operates even when the structure is coated in a reflective material. Therefore, the anti-reflective nanostructures 35 may be formed simultaneously with the array of reflective elements and the relief defining the non-dispersive colour-generating structure and subsequently coated in the reflection enhancing material 4 needed to render the reflective elements reflective and the non-dispersive colour-generating structure functional.

A method of manufacturing the security devices according to the invention will now be described with reference to FIGS. 18A to 18D.

Figure 18A:
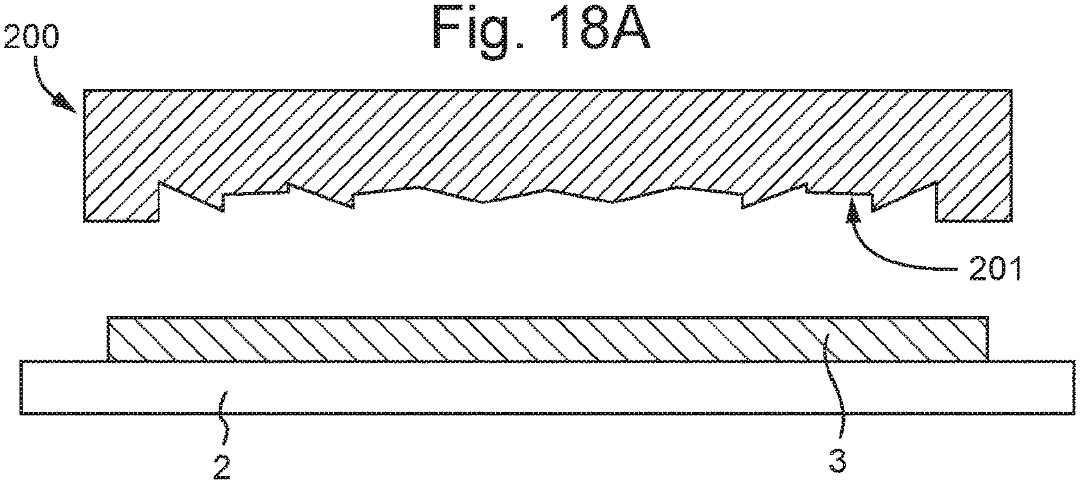
FIGS. 18A to 18D show, schematically, the security device carried by the security document of FIG. 1 at four different stages during manufacture.

The surface structure, including both the array of reflective elements 10 and the non-dispersive colour-generating relief structure 20 profile can be provided in a master die, for example by using e-beam lithography. FIG. 18A shows a master die 200 with a negative of the desired surface structure 201. This surface structure in the die defines negatives of the array of reflective elements 10, including, for example, a plasmonic nanostructure array as the non-dispersive colour-generating relief structure 20. FIG. 18A also shows a transparent support layer 2, which may be a layer of the final security device 100. On the surface of the transparent support layer 2 is provided a UV curable material 3. In alternative embodiments, the curable material 3 is directly applied onto the security document and the surface relief subsequently formed in the surface of the curable material while on the security document. This alternative requires no subsequent transferral of the security device onto a security document. In yet further alternatives, the security element may be formed directly into the substrate of the security document by using a formable polymer substrate in place of the UV curable material 3.

Figure 18B:
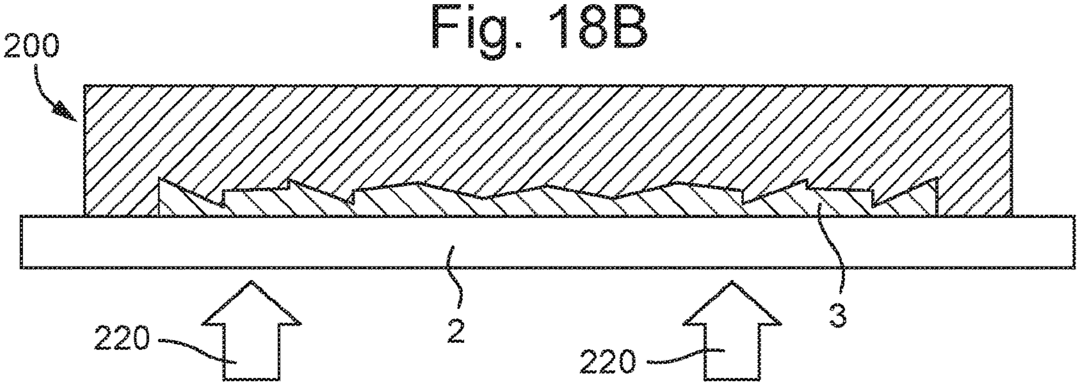

FIG. 18B shows the die 200 being brought into contact with the curable material 3 so as to form the curable material into the desired surface shape, i.e. into a series of micromirrors with non-dispersive colour-generating relief structure provided in the surface thereof. FIG. 18B also illustrates that the curable material 3 is exposed to UV radiation 220 through the transparent support layer 110, while in contact with the die 200. Alternatively, a transparent die may be used.

Figure 18C:
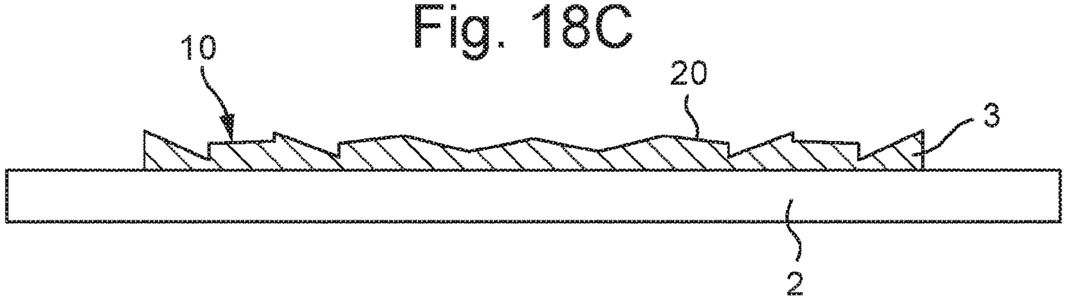

FIG. 18C shows the cured curable material 3 after separation from the die 200. The cured curable material now exhibits an array of reflective elements 10 with non-dispersive colour-generating relief structure 20 provided in the surface thereof. However, at this stage, the device may not yet be reflective and the non-dispersive colour-generating relief structure may not yet be complete and functional.

Figure 18D:
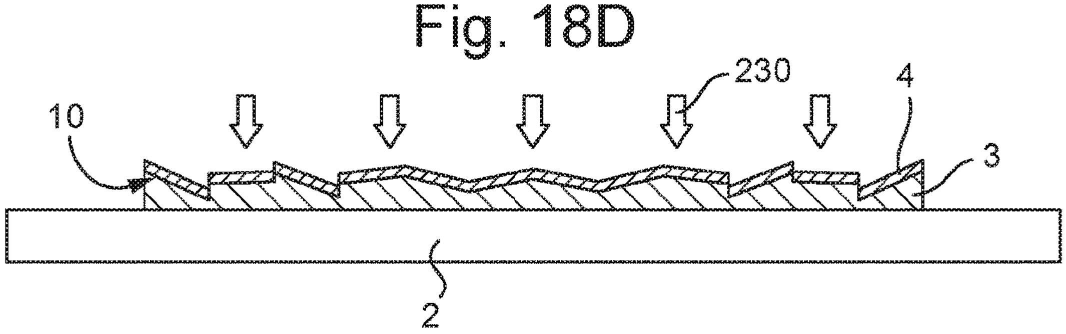

FIG. 18D shows a cross section of the final security element 100 after the surface has been coated in a reflection enhancing layer 112, in this case a coating of aluminium. The reflection enhancing layer may be formed on the surface of the security element using a vapour deposition process 230, for example. As can be seen here, the security device now comprises an array of reflective elements 10, in the surface of which is formed a non-dispersive colour-generating relief structure 20, such as an array of plasmonic nanostructures.

If the non-dispersive colour-generating structure was instead a zero order diffractive structure, as described above, a final step may be provided of applying an overcoat of a transparent material having substantially the same refractive index as the curable material 3.

Another embodiment will now be described with reference to FIG. 19.

Figure 19:
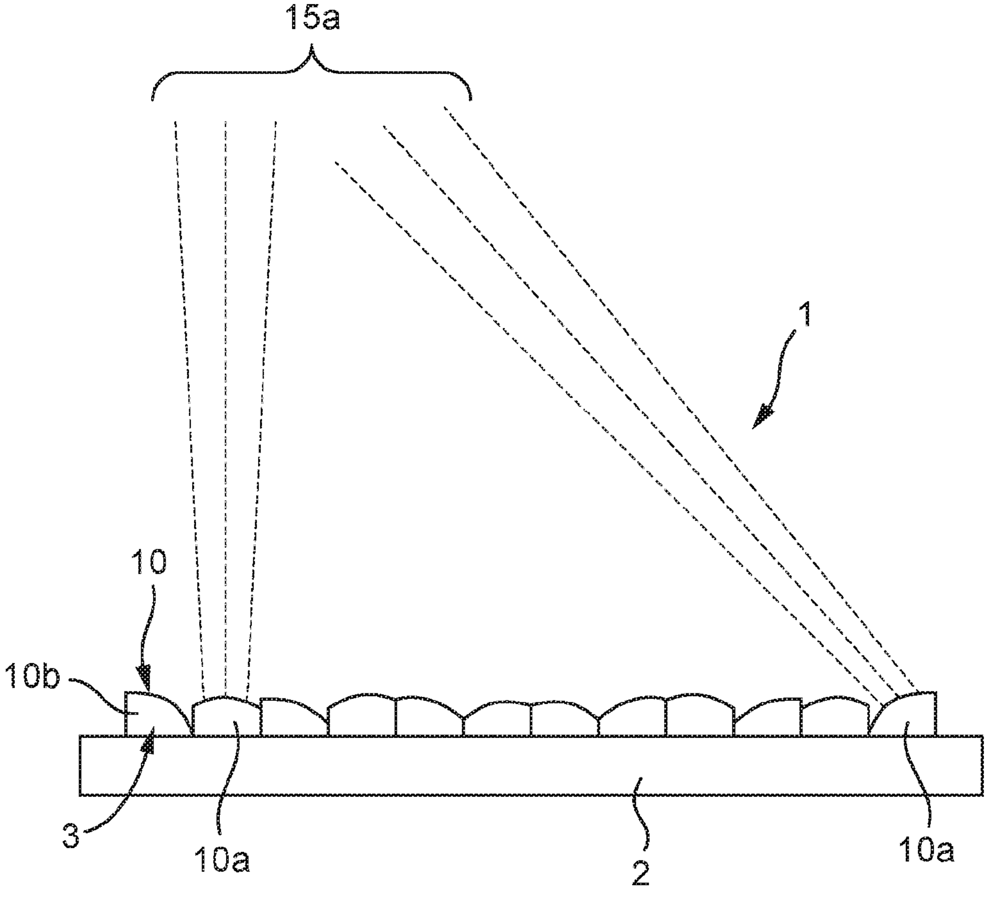
FIG. 19 shows, schematically, an enlarged cross section through a security device according to another embodiment.

The embodiment of FIG. 19 is similar in design to the embodiment of FIG. 3, except in that each reflective element is convex along the interlacing direction, rather than planar. The result is that each reflective element will reflect light incident along one direction into an expanding cone of angles depending upon where the light was incident with each reflective element along its convex direction. In FIG. 19, these cones of reflected angles are shown for the leftmost and rightmost reflective elements of the first set of reflective elements 10*a* for clarity, but it will be appreciated that each convex reflective element will have this effect on incident light. The result is that the viewing zone 15*a* of each set is widened slightly, owing to the cone of angles into which incident light is reflected. This can reduce or eliminate the gap between viewing zones while maintaining the high brightness of the image, particularly towards the centre of each viewing zone, resulting from the collective convergent effect the reflective elements have on incident light.

Figure 20:
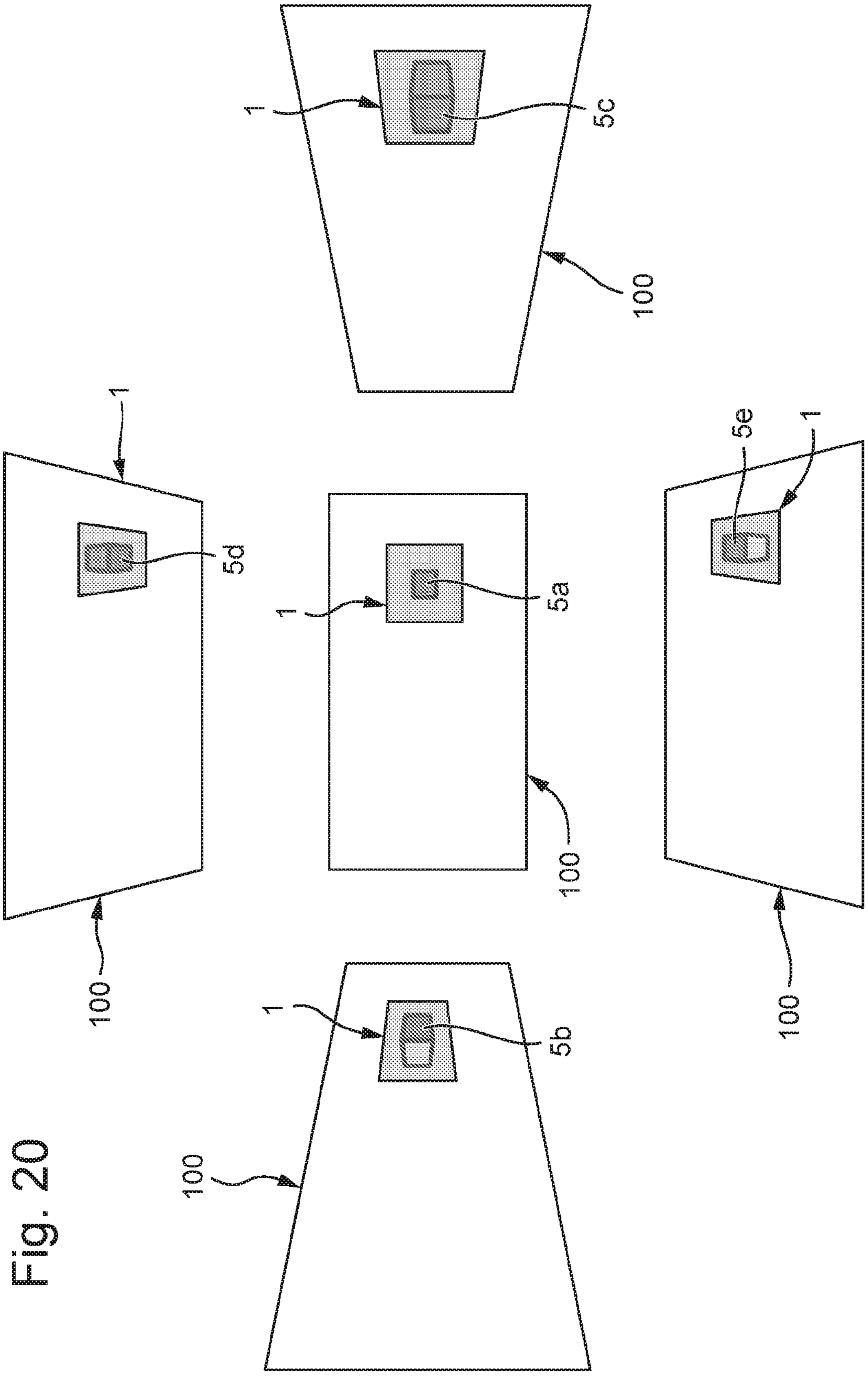
FIG. 20 shows, schematically, five different viewing positions of a security document carrying a security device according to an embodiment.

FIG. 20 shows an embodiment that is particularly suited to the use of convex reflective elements for widening the viewing zones of the set of reflective elements. FIG. 20 shows a security document 100, again a banknote, carrying a security device 1, at five different viewing positions. In the centre of FIG. 20, the appearance of the security device is shown at a normal viewing angle, i.e. perpendicular to the plane of the security device. This embodiment comprises five sets of reflective elements producing corresponding viewing zones, towards which light is convergently reflected. These five sets of reflective elements may be interlaced along two interlacing directions as part of a two-dimensional array of reflective elements, as has been described above.

In this embodiment, the first set of reflective elements exhibit the first image 5*a*, in this case, a view of a cube such that only a front face is visible in blue. The first set of reflective elements is configured to have an overall concave profile along the horizontal direction across the security device and a concave profile along the vertical direction across the security device. Furthermore, each reflective element is convex along both vertical and horizontal directions to widen the first viewing zone.

In this embodiment, the security device is configured such that tilting of the security document gives the impression of a corresponding rotation of the cube shown in the centre image 5*a*. To do this, second to fifth sets of reflective elements are provided that produce images in viewing zones located in each of left, right, forwards and backwards tilting of the security device. The second set of reflective elements may have a generally concave profile across the security device along both the horizontal and vertical directions. Again, each individual reflective element is also convex. The second set of reflective elements exhibits the second image 5*b* when the left side of the security document is rotated towards the viewer. As mentioned, this second image is a view of the cube shown in the first image, but rotated so that the front face and a left face of the cube in red are visible; this is shown in the left view in FIG. 20. Because each individual reflective element of the second set is convex, this second image 5*b* is visible across a widened viewing zone, while maintaining a good brightness owing to the generally concave profile of the set of reflective elements across the security device. The widening of the viewing zone resulting from the individual reflective elements of the second set being convex means that the second viewing zone can extend right up to or partially overlap the first, central viewing zone, so that there is substantially no position between the first and second viewing zones at which no image is visible. This prevents any apparent drop out of the image as the device is rotated.

Similarly to the second set of reflective elements, the third set of reflective elements provides that a third image 5*c* is visible when the right side of the security document is rotated towards the viewer. As mentioned, this third image is a view of the cube shown in the central image, this time rotated so that the front face and a right face of the cube in green are visible; this is shown in the right view in FIG. 20. Again, the third set of reflective elements may have a generally concave profile across the security device along both the horizontal and vertical directions, and each individual reflective element may also be convex. This may again provide that there is substantially no position between the first and third viewing zones at which no image is visible, preventing drop out of the image.

The fourth and fifth sets of reflective elements likewise provide upper and lower views of the cube seen in the first image. That is, the fourth set of reflective elements provides that when the top of the security device is tilted towards the viewer a fourth image 5*d* is seen in which the front face and a top face of the cube in orange are seen. Similarly, the fifth set of reflective elements provides that when the bottom of the security device is tilted towards the viewer a fifth image 5*e* is seen in which the front face and a bottom face of the cube in purple are seen. Both of these sets of reflective elements may have a generally concave profile across the security device along both the horizontal and vertical direction and have reflective elements that are individually convex along both directions. Again, these may provide image continuity as the security document is rotated from the centre image 5*a* into the viewing zones for the fourth and fifth images 5*d*, 5*e*.

While only five images associated with five sets of reflective elements are shown here to illustrate the underlying principle, it will be appreciated that more may typically be used. For example, the apparent 3D rotation of an object is more convincing where more than three views of the object are shown along any one tilt direction. The use of more viewing zones providing more images can provide a more smooth animation of the rotation.

Figure 21:
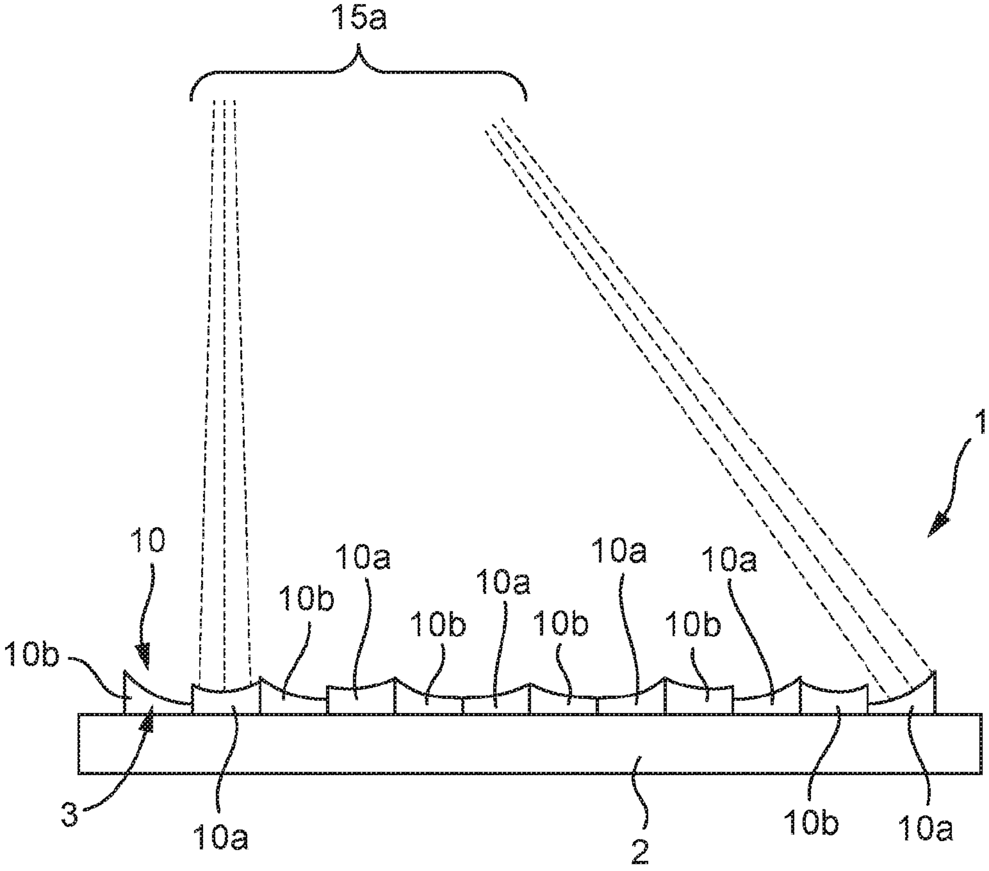
FIG. 21 shows, schematically, an enlarged cross section through a security device according to another embodiment.

Another embodiment will now be described with reference to FIG. 21. The embodiment of FIG. 21 is similar in design to the embodiments of FIG. 3 and FIG. 19, except in that each reflective element is concave along the interlacing direction, rather than planar or convex. The result is that each reflective element will reflect light incident along one direction into a narrowing cone of angles depending upon where the light was incident on each reflective element along its concave direction. Preferably, the precise concavity of each of the reflective elements will be predetermined to focus reflected light towards a viewing position around 20 cm to 30 cm from the security device. In FIG. 21, the reflected light is shown for the leftmost and rightmost reflective elements of the first set of reflective elements 10*a* for clarity, but it will be appreciated that each concave reflective element will have this effect on incident light. The result is that the viewing zone 15*a* of each set is narrowed slightly and the brightness of the image increased. This can provide visually striking high brightness images that cleanly switch between different images as the viewer moves between different viewing zones. Whereas the embodiment of FIG. 19 was particularly suited to displaying persistent, related images, this embodiment is suited to displaying images unrelated in their image content as the narrowed viewing zone will minimise superposition of the images and prevent visually confusing crosstalk.

Security devices of the sorts described above are suitable for forming on security articles such as threads, stripes, patches, foils and the like which can then be incorporated into or applied onto security documents such as banknotes. The security devices can also be constructed directly on security documents, such as polymer banknotes.

Security devices of the sorts described above can be incorporated into or applied to any product for which an authenticity check is desirable. In particular, such devices may be applied to or incorporated into documents of value such as banknotes, passports, driving licenses, cheques, identification cards etc. The security device can either be formed directly on the security document (e.g. on a polymer substrate forming the basis of the security document) or may be supplied as part of a security article, such as a security thread or patch, which can then be applied to or incorporated into such a document. The security device may be applied to a security document, for example by using a pressure sensitive adhesive.

Such security articles can be arranged either wholly on the surface of the base substrate of the security document, as in the case of a stripe or patch, or can be visible only partly on the surface of the document substrate, e.g. in the form of a windowed security thread. Security threads are now present in many of the world's currencies as well as vouchers, passports, travellers' cheques and other documents. In many cases the thread is provided in a partially embedded or windowed fashion where the thread appears to weave in and out of the paper and is visible in windows in one or both surfaces of the base substrate. One method for producing paper with so-called windowed threads can be found in EP 0059056 A1. EP 0860298 A2 and WO 03095188 A2 describe different approaches for the embedding of wider partially exposed threads into a paper substrate. Wide threads, typically having a width of 2 to 6 mm, are particularly useful as the additional exposed thread surface area allows for better use of optically variable devices, such as that presently disclosed.

Base substrates suitable for making security substrates for security documents may be formed from any conventional materials, including paper and polymer. Techniques are known in the art for forming substantially transparent regions in each of these types of substrate. For example, WO 8300659 A1 describes a polymer banknote formed from a transparent substrate comprising an opacifying coating on both sides of the substrate. The opacifying coating is omitted in localised regions on both sides of the substrate to form a transparent region. In this case the transparent substrate can be an integral part of the security element or a separate security element can be applied to the transparent substrate of the document. WO 0039391 A1 describes a method of making a transparent region in a paper substrate.

The security device may also be applied to one side of a paper substrate, optionally so that portions are located in an aperture formed in the paper substrate. An example of a method of producing such an aperture can be found in WO 03054297 A2. An alternative method of incorporating a security element which is visible in apertures in one side of a paper substrate and wholly exposed on the other side of the paper substrate can be found in WO 2000/39391 A1.

The security device of the current invention can be made machine readable by the introduction of detectable materials into one or more of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials.

Particularly in embodiments in which the non-dispersive colour-generating relief structures are metallised, e.g. in which plasmonic nanostructures comprising a layer of aluminium are used, the security device can be used to conceal the presence of a machine readable dark magnetic layer, for example, provided beneath the formable layer 3. When a magnetic material is incorporated into the device the magnetic material can be applied in any design but common examples include the use of magnetic tramlines or the use of magnetic blocks to form a coded structure. Suitable magnetic materials include iron oxide pigments ($Fe_2O_3$ or $Fe_3O_4$), barium or strontium ferrites, iron, nickel, cobalt and alloys of these. In this context the term "alloy" includes materials such as Nickel:Cobalt, Iron:Aluminium:Nickel:Cobalt and the like. Flake Nickel materials can be used; in addition Iron flake materials are suitable. Typical nickel flakes have lateral dimensions in the range 5-50 microns and a thickness less than 2 microns. Typical iron flakes have lateral dimensions in the range 10-30 microns and a thickness less than 2 microns.

The invention claimed is:

1. A security device comprising:

an array of reflective elements including at least a first set of reflective elements and a second set of reflective elements, the first and second sets of reflective elements being regularly or irregularly interlaced along at least a first interlacing direction across a first area of the security device, and a non-dispersive colour-generating structure provided in the surface of at least the first set of reflective elements, wherein the first set of reflective elements is configured to collectively exhibit a first image across the first area of the security device to a viewer within a first viewing zone, with light reflected from each reflective element of the first set of reflective elements providing a different region of the first image visible at one or more viewing positions within the first viewing zone, and the second set of reflective elements is configured to collectively exhibit a second image across the first area of the security device to the viewer within a second viewing zone different from the first viewing zone, with light reflected from each reflective element of the second set of reflective elements providing a different region of the second image visible at one or more viewing positions within the second viewing zone, the non-dispersive colour generating structure is modulated across at least the first set of reflective elements such that the first image includes multiple colours, and orientations of the reflective elements within the first set of reflective elements vary across the array of reflective elements such that the first set of reflective elements is configured to collectively direct incident light convergently and/or divergently towards the first viewing zone of the first image.

2. A security device according to claim 1, wherein the second set of reflective elements is configured to collectively direct incident light convergently and/or divergently towards the second viewing zone of the second image.

3. A security device according to claim 1, wherein the first set of reflective elements comprises a first array of elongate reflective elements and/or the second set of reflective elements comprises a second array of elongate reflective elements, and wherein the first and second sets of reflective elements are regularly or irregularly interlaced along the first interlacing direction across the first area of the security device.

4. A security device according to claim 1, wherein the first set of reflective elements comprises a first two-dimensional array of reflective elements and/or the second set of reflective elements comprises a second two-dimensional array of reflective elements, and wherein the first and second sets of reflective elements are regularly or irregularly interlaced along both the first interlacing direction and a second interlacing direction orthogonal to the first interlacing direction across the first area of the security device.

5. A security device according to claim 1, wherein the first and second sets of reflective elements are regularly or irregularly interlaced along the first interlacing direction such that at least some of the reflective elements belonging to the first set are spaced along the first interlacing direction by at most 1000 μm, and/or such that at least some of the reflective elements belonging to the second set are spaced along the first interlacing direction by at most 1000 μm.

6. A security device according to claim 5, wherein the first and second sets of reflective elements are regularly or irregularly interlaced along both the first interlacing direction and a second interlacing direction orthogonal to the first interlacing direction such that at least some of the reflective elements belonging to the first set are spaced along the second interlacing direction by at most 1000 μm, and/or such that at least some of the reflective elements belonging to the second set are spaced along the second interlacing direction by at most 1000 μm.

7. A security device according to claim 1, wherein the non-dispersive colour-generating relief structure comprises a first array of plasmonic nanostructures provided in the surface of first set of reflective elements and/or a second array of plasmonic nanostructures provided in the surface of second set of reflective elements.

8. A security device according to claim 7, wherein the plasmonic nanostructures of the first and/or second arrays of plasmonic nanostructures vary in at least one of their shape, size and spacing across the first and/or second arrays of plasmonic nanostructures such that the first and/or second images include multiple colours.

9. A security device according to claim 1, wherein the non-dispersive colour-generating relief structure comprises a first zero order diffractive structure, such as a zero order diffraction grating, provided in the surface of first set of reflective elements and/or a second zero order diffractive structure, such as a zero order diffraction grating, provided in the surface of second set of reflective elements.

10. A security device according to claim 9, wherein the first and/or second zero order diffractive structure varies in one or more of its pitch, orientation, and profile of the elements of the diffractive structure across the first and/or second arrays of plasmonic nanostructures such that the first and/or second images include multiple colours.

11. A security device according to claim 9, wherein the first and/or second zero order diffractive structure is configured to exhibit rotational colourshift.

12. A security device according to claim 1, wherein the non-dispersive colour-generating relief structure is modulated across the first set of reflective elements such that at least one of the reflective elements of the first set of reflective elements exhibits multiple colours, and/or wherein the non-dispersive colour-generating relief structure is modulated across the second set of reflective elements such that at least one of the reflective elements of the second set of reflective elements exhibits multiple colours.

13. A security device according to claim 1, wherein the array of reflective elements further comprises an anti-reflective microstructure provided in the surface of first and/or second sets of reflective elements, the anti-reflective microstructure defining substantially black portions of the first and/or second images.

14. A security device according to claim 1, wherein the first image is at least partly defined by the arrangement of the first set of reflective elements across the security device, and/or wherein the second image is at least partly defined by the arrangement of the second set of reflective elements across the security device.

15. A security device according to claim 1, wherein the first image is at least partly defined by the modulation of the non-dispersive colour generating structure across the first set of reflective elements, and/or wherein the second image is at least partly defined by the modulation of the non-dispersive colour generating structure across the second set of reflective elements.

16. A security device according to claim 1, wherein the first and/or second sets of reflective elements comprises an array of substantially planar reflective elements, or an array of concave or convex reflective elements.

17. A security device according to claim 1, wherein the first set of reflective elements is configured to collectively direct incident light convergently or divergently towards the first viewing zone of the first image such that the light converges or diverges along a first direction and a second direction orthogonal to the first direction.

18. A security device according to claim 1, wherein the first and second sets of reflective elements are configured such that the first and second viewing zones substantially do not overlap, such that an image switch effect is observed upon a viewer moving between the first viewing zone and the second viewing zone.

19. A security device according to claim 1, wherein the first set of reflective elements is configured to collectively direct incident light towards the first viewing zone such that light converges along a first direction, and wherein the second set of reflective elements is configured to collectively direct incident light towards the second viewing zone such that light diverges along the first direction.

20. A method of manufacturing a security device comprising:

providing an array of reflective elements including at least a first set of reflective elements and a second set of reflective elements, the first and second sets of reflective elements being regularly or irregularly interlaced along at least a first interlacing direction across a first area of the security device; and providing a non-dispersive colour-generating structure in the surface of at least the first set of reflective elements, wherein the first set of reflective elements is configured to collectively exhibit a first image across the first area of the security device to a viewer within a first viewing zone, with light reflected from each reflective element of the first set of reflective elements providing a different region of the first image visible at one or more viewing positions within the first viewing zone, and the second set of reflective elements is configured to collectively exhibit a second image across the first area of the security device to the viewer within a second viewing zone different from the first viewing zone, with light reflected from each reflective element of the second set of reflective elements providing a different region of the second image visible at one or more viewing positions within the second viewing zone, the non-dispersive colour generating structure is modulated across at least the first set of reflective elements such that the first image includes multiple colours, and orientations of the reflective elements within the first set of reflective elements vary across the array of reflective elements such that the first set of reflective elements is configured to collectively direct incident light convergently and/or divergently towards the first viewing zone of the first image.

* * * * *